United States Patent [19]
Owashi et al.

[11] Patent Number: 5,903,704
[45] Date of Patent: May 11, 1999

[54] APPARATUS FOR SELECTIVELY RECORDING AND REPRODUCING RECEIVED ANALOG AND DIGITAL SIGNALS

[75] Inventors: Hitoaki Owashi; Takaharu Noguchi; Hiroo Okamoto; Kyoichi Hosokawa; Kazuhiko Yoshizawa; Nobutaka Amada; Naozumi Sugimura, all of Yokohama; Hiroaki Tachibana, Chigasaki; Hiroyuki Hayakawa, Yokohama, all of Japan

[73] Assignee: Hitachi, Ltd., Japan

[21] Appl. No.: 08/500,833

[22] Filed: Jul. 11, 1995

[30] Foreign Application Priority Data

| Aug. 26, 1994 | [JP] | Japan | 6-201757 |
| Sep. 7, 1994 | [JP] | Japan | 6-214009 |
| Oct. 28, 1994 | [JP] | Japan | 6-264877 |

[51] Int. Cl.$^6$ ............................... H04N 5/92; H04N 5/76
[52] U.S. Cl. ................................ 386/95; 386/35; 386/108
[58] Field of Search .................. 386/95–104, 108, 386/114, 131, 23, 35; 360/18, 20–21; 348/722–724; H04N 5/76, 5/92, 5/91, 5/222, 5/38, 5/40

[56] References Cited

U.S. PATENT DOCUMENTS

| 3,773,979 | 11/1973 | Kirk, Jr. et al. | 348/724 |
| 4,591,924 | 5/1986 | Miura et al. | 358/330 |
| 4,807,055 | 2/1989 | Tsunoda et al. | 386/104 |
| 5,289,288 | 2/1994 | Silverman et al. | 386/97 |
| 5,313,342 | 5/1994 | Soda et al. | 360/63 |
| 5,319,501 | 6/1994 | Mitsuhashi | 386/101 |
| 5,359,428 | 10/1994 | Kubota et al. | 386/33 |
| 5,438,463 | 8/1995 | Nishiumi et al. | 386/96 |
| 5,519,544 | 5/1996 | Hara | 386/96 |
| 5,548,410 | 8/1996 | Kim et al. | 386/104 |
| 5,572,331 | 11/1996 | Yu | 386/95 |

FOREIGN PATENT DOCUMENTS

| 0 606 180 A2 | of 1994 | European Pat. Off. . |
| 4-219613 | of 1992 | Japan . |
| 5-207507 | 8/1993 | Japan . |

OTHER PUBLICATIONS

Transactions The Institute of Television Engineers of Japan, vol. 46, No. 1, pp. 31–39, 1992.

Little et al., "A Digital On–Demand Video Service Supporting Content–Based Queries", ACM Multimedia 93, pp. 427–436, Jul. 1993.

*Primary Examiner*—Thai Tran
*Attorney, Agent, or Firm*—Evenson, McKeown, Edwards & Lenahan, P.L.L.C.

[57] ABSTRACT

A communication system has an analog signal broadcasting station for transmitting an analog signal, a digital signal broadcasting station for transmitting a digital signal and a receiving unit for receiving the analog signal from the analog signal broadcasting station and the digital signal from the digital signal broadcasting station. The receiving unit has a recording and reproducing unit for selectively recording one of received analog and digital signals. The recording and reproducing unit has heads for analog signal each having a predetermined azimuth angle and operative to record an analog signal and heads for digital signal each having an azimuth angle larger than that of the analog signal head and operative to record a digital signal, and performs selective recording and reproduction of the analog signal and the digital signal on and from a recording medium.

13 Claims, 12 Drawing Sheets

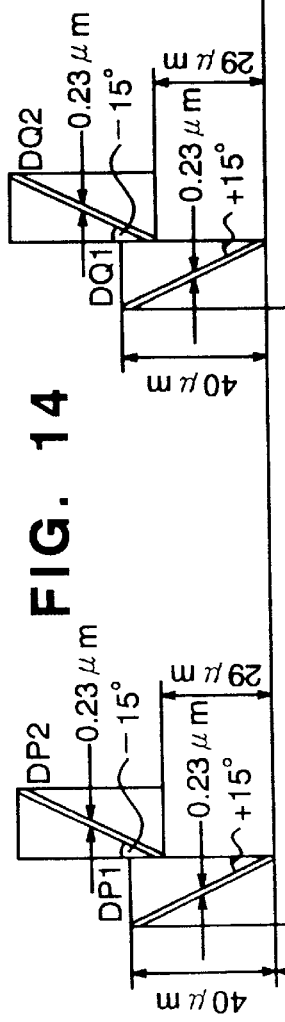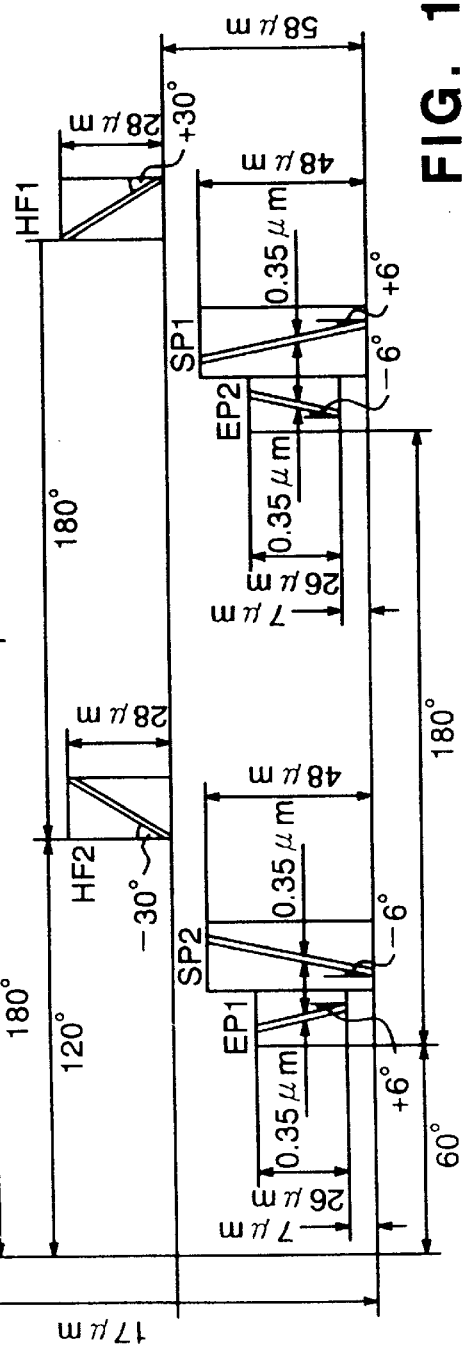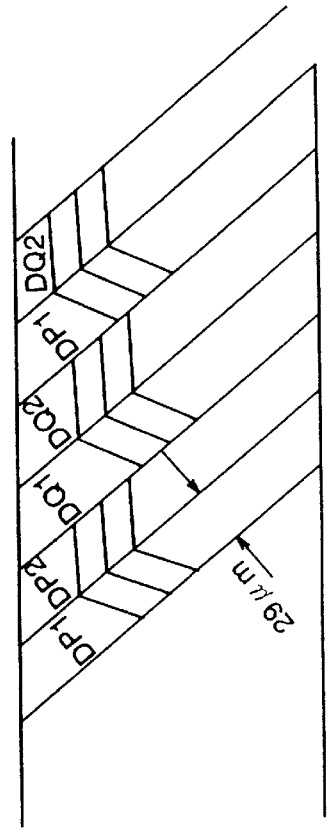

APPARATUS FOR SELECTIVELY RECORDING AND REPRODUCING RECEIVED ANALOG AND DIGITAL SIGNALS

BACKGROUND OF THE INVENTION

The present invention relates to a communication system in which communication is carried out through a communication medium such as a coaxial cable, an optical cable, a telephone circuit or satellite broadcasting and an apparatus for recording and reproducing a signal communicated through the communication medium and more particularly, to a communication system for encrypted data and an apparatus for selectively recording and reproducing a received analog signal and a received digital signal.

A technique concerning a system for encryption and decryption of a video signal and an audio signal as well as fee charging is described in, for example, "Transactions The Institute of Television Engineers of Japan", Vol. 46, No. 1, January, 1992, pp. 31–39.

The above paper describes a technique concerning the system for encryption and decryption of a video signal and an audio signal as well as fee charging in satellite communication service. However, that paper fails to disclose method and technique which can store a received signal while protecting a copyright of the signal and can charge fees of decryption and storage of the signal.

A technique of selecting a digital signal or an analog signal and recording it on the same magnetic recording and reproducing apparatus is described in, for example, JP-A-5-207507.

Available for a domestic magnetic recording and reproducing apparatus (hereinafter referred to as VTR) are, for example, VHS, β and 8 millimeter-VTR standards. In any of these standards, an analog television signal is FM modulated and then recorded. It is stipulated that an audio signal can also be FM modulated and recorded in accordance with each standard. An apparatus for multiplexing, recording and reproducing analog video and audio signals in this manner is disclosed in U.S Pat. No. 4,591,924.

When a television signal is FM modulated for analog recording, there arises a problem that the S/N ratio is inevitably deteriorated owing to recording and reproduction. To cope with this problem, the television signal is digitized and then recorded. For example, D-1, D-2 and D-3 standards prescribed by SMPTE are available. These standards are determined by taking the use for broadcasting into account and therefore, a tape cassette different from that used for the aforementioned domestic VTR is used under these standards.

The fact that quality of recording and reproduction is improved by recording and reproducing a digital signal is desirable but when user's merit is taken into consideration, it is preferable that the conventional analog signal be also recorded and reproduced. In other words, exchangeable reproduction of analog and digital signals must be taken into account.

This requires that at least the shape of a cassette to be used be the same for analog and digital signals and the tape transport system be also the same for analog and digital signals. Further, by making the recording and reproducing head or at least the azimuth angle of the head identical for analog and digital signals, exchangeability can be facilitated and cost reduction can be ensured.

But it has been found that the above expedient faces a new problem. For example, when the digitally recorded cassette is inserted by mistake into the conventional analog VTR, the recorded digital signal is mistaken for an FM signal and is FM demodulated inadvertently. Especially when the FM demodulated signal is an audio signal, the demodulated audio signal has a large amplitude and so large a sound that possibly surprises persons involved and damages the apparatus is generated from a loudspeaker.

The aforementioned conventional technique fails to show what problem arises when the digitally recorded cassette is loaded on the conventional analog VTR. Needless to say, the conventional technique does not clarify how to solve the problem.

SUMMARY OF THE INVENTION

An object of the present invention is to provide an apparatus for selectively recording and reproducing an analog signal and a digital signal.

Another object of the present invention is to provide a data receiving unit which can receive and decrypt or store an encrypted signal while protecting a copyright of the signal and which is suitable to charge fees of decryption and storage of the signal.

According to the present invention, in a recording and reproducing apparatus for selectively recording a digital signal and an analog signal, there are provided a head for digital signal adapted to record a digital signal and a head for analog signal adapted to record an analog signal, and the digital signal head has an azimuth angle which is larger than that of the analog signal head.

Further, the digital signal head has a gap length which is smaller than that of the analog signal head.

Also, in a recording and reproducing apparatus for recording an analog television signal of at least one of PAL, SECAM and NTSC schemes and a digital signal by using rotary heads carried on a cylinder, means for controlling the rotation of the cylinder is provided which controls the rotation of the cylinder such that the rotation number of the cylinder during recording the digital signal is substantially equal to that during recording the analog television signal of the NTSC type.

Further, in a recording and reproducing apparatus for azimuth recording of a digital signal, an analog video signal and an analog audio signal, there are provided a head for digital signal, a head for analog video signal and a head for analog audio signal, and the digital signal head has an azimuth angle which is larger than that of the analog video signal head but is smaller than that of the analog audio signal head.

By performing azimuth recording in which the azimuth angle is different for adjacent tracks, a reproduced signal from an adjacent track can be suppressed. In the reproduced analog signal processing in the VTR, the signal processing is carried out in which a low frequency component of a signal from the adjacent track responsible for reduction of the azimuth effect is suppressed. Since the azimuth angle of the digital signal head is larger than that of the analog signal head, the azimuth effect can be promoted and the low frequency component of the adjacent track signal can be more suppressed during digital signal reproduction than during analog signal reproduction, thereby permitting recording and reproduction in which the error rate is reduced. In addition, by making the azimuth angle of the digital signal head smaller than that of the analog audio signal head, the level of a reproduction signal from the analog audio signal head can be decreased even when a digitally recorded tape is inserted into the analog VTR by mistake, thereby preventing generation of an abnormal sound.

Further, by making the gap length of the digital signal head smaller than that of the analog signal head, high frequency recording and reproducing characteristics for a digital signal can be improved to ensure recording at high density.

Further, by making the rotation number of the cylinder substantially identical for digital signal recording and analog NTSC signal recording, control operation can be facilitated and the rotation number of the cylinder is larger for NTSC recording than for PAL or SECAM recording, thereby increasing the recording rate of a digital signal.

According to another specific form of the present invention, when in a transmitting apparatus a user requests transmission of desired data, a key signal is calculated from a predetermined initial value pursuant to an arithmetic formula corresponding to the user, the desired data requested to be transmitted is encrypted on the basis of the key signal to form main data, and the main data is multiplexed with the initial value and a user identifying code so as to be transmitted.

In a receiving unit, on the other hand, the main data is demultiplexed from the initial value and the user identifying code, reception of the required data requested to be transmitted by this receiving unit is confirmed using the user identifying code, a key signal is generated from the initial value pursuant to the arithmetic formula corresponding to the user, and the required data is decrypted from the main data on the basis of the key signal.

Further, in the receiving unit, after reception of the required data is confirmed, the main data can be multiplexed with the initial value so as to be recorded on a recording unit. Furthermore, when performing recording on the recording unit, the initial value can be converted into a key signal by using the arithmetic formula and thereafter the key signal can be recorded.

In the receiving unit, permission of signal reception by a reception contractor is confirmed using a preset identifying code and thereafter, an initial value delivered out of input signal demultiplexing means is subjected to an arithmetic operation to generate a key signal. For a person who is not the contractor, the correct key signal cannot be obtained from the initial value through the arithmetic operation. For a user who is not given permission of reception from a data distributor, a cipher of main data cannot be decrypted because the main data is encrypted for only a user who is given permission of reception.

Here, the identifying code is a code which indicates that a distributor of a receiving signal allows a reception contractor to receive a signal and which is added to discriminate the present unit from another similar data receiving unit.

BRIEF DESCRIPTION OF THE DRAWINGS

FIG. 14 is a view showing, in developed strip form, the head arrangement of FIG. 13 realized on the periphery of a cylinder.

FIG. 15 is a diagram showing the relation between the track and the azimuth angle when data is recorded on a magnetic tape by using heads for digital signal of FIG. 13.

DESCRIPTION OF THE PREFERRED EMBODIMENTS

Figure 1:
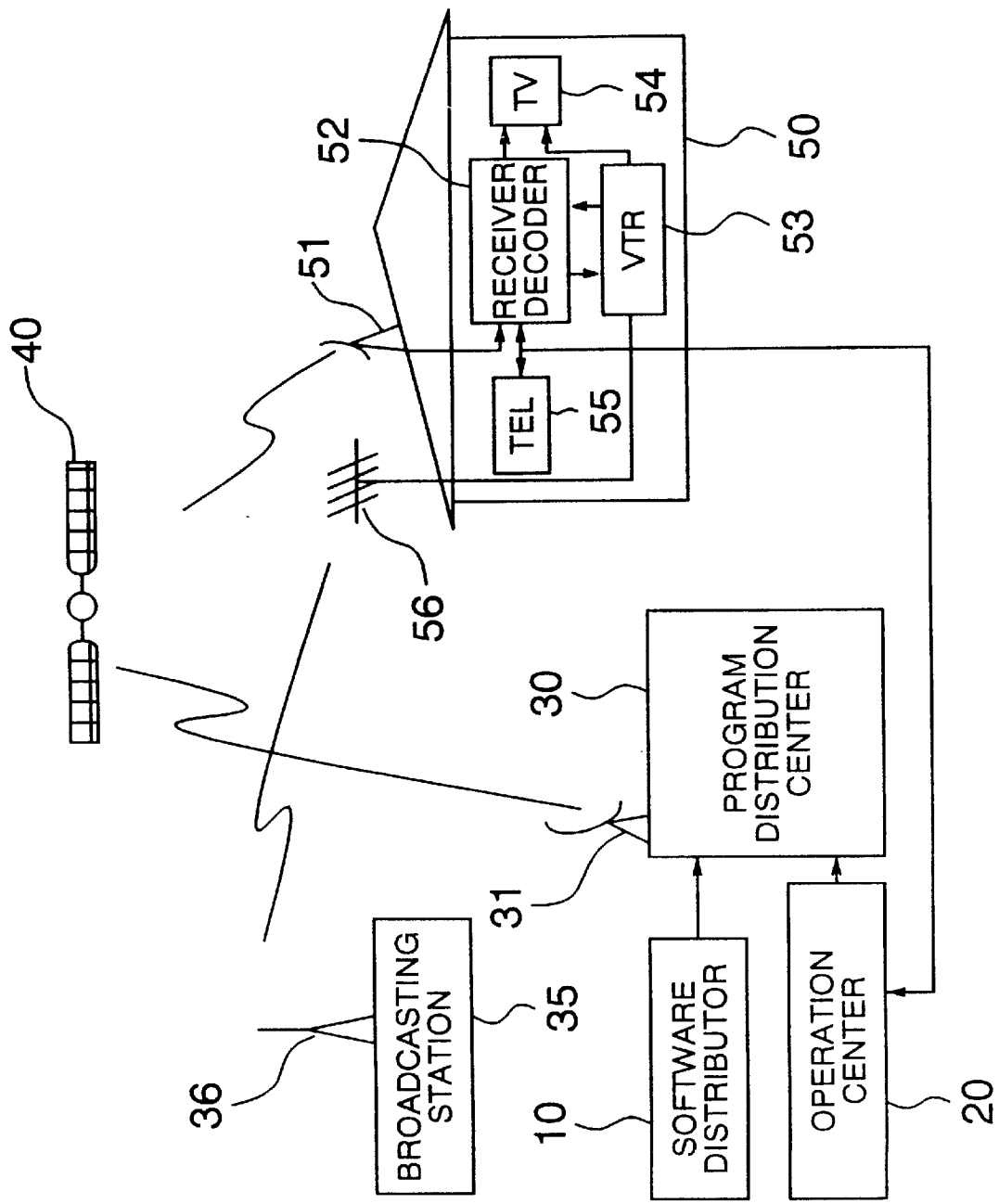
FIG. 1 is a schematic diagram for explaining an overall communication system according to the present invention of a multi-channel chargeable digital broadcasting system utilizing a communication satellite and an analog television broadcasting system.

A video distribution service using a satellite will be described as one embodiment of the present invention with reference to FIG. 1.

The video distribution service is carried out by an operator who manages an operation center 20. The operator makes a contract with a software distributor 10 to ask it to supply needful or required software to a program distribution center 30. In an embodiment shown in FIG. 1, only one software distributor 10 is depicted but typically, a plurality of software distributors can participate in supply of software.

The program distribution center 30 is provided with a transmitter 31 which radiates an electric wave targeting on a satellite 40. The satellite 40 receives the electric wave and transmits it towards a subscriber 50. The transmitted electric wave is received by a receiver 51.

The electric wave received by the receiver 51 is inputted to a receiver decoder 52 which in turn selects software of a required channel. The selected software is recorded on a VTR 53 as necessary. A signal corresponding to the data recorded on the VTR 53 is reproduced when desired and is returned to the receiver decoder 52 so as to be decoded thereby to the original video signal which in turn is delivered to a television 54.

By using a telephone set 55, the subscriber can also asks the operation center 20 to transmit software the subscriber wants to see. The operation center 20 can also research receiving and audience conditions of the subscriber 50 from the receiver decoder 52 through a telephone circuit and can charge a fee in compliance with audience conditions.

Further, an electric wave broadcasted from an existing broadcasting station 35 by way of a transmitter 36 is received by a receiver 56 and a received signal is inputted to the VTR 53 so as to be recorded thereon. A signal reproduced from the VTR 53 can be inputted to the television 54 and can be watched. When recording on the VTR 53 is not needed, a signal from the receiver 56 can of course be inputted directly to the television 54 so as to be watched.

Figure 2:
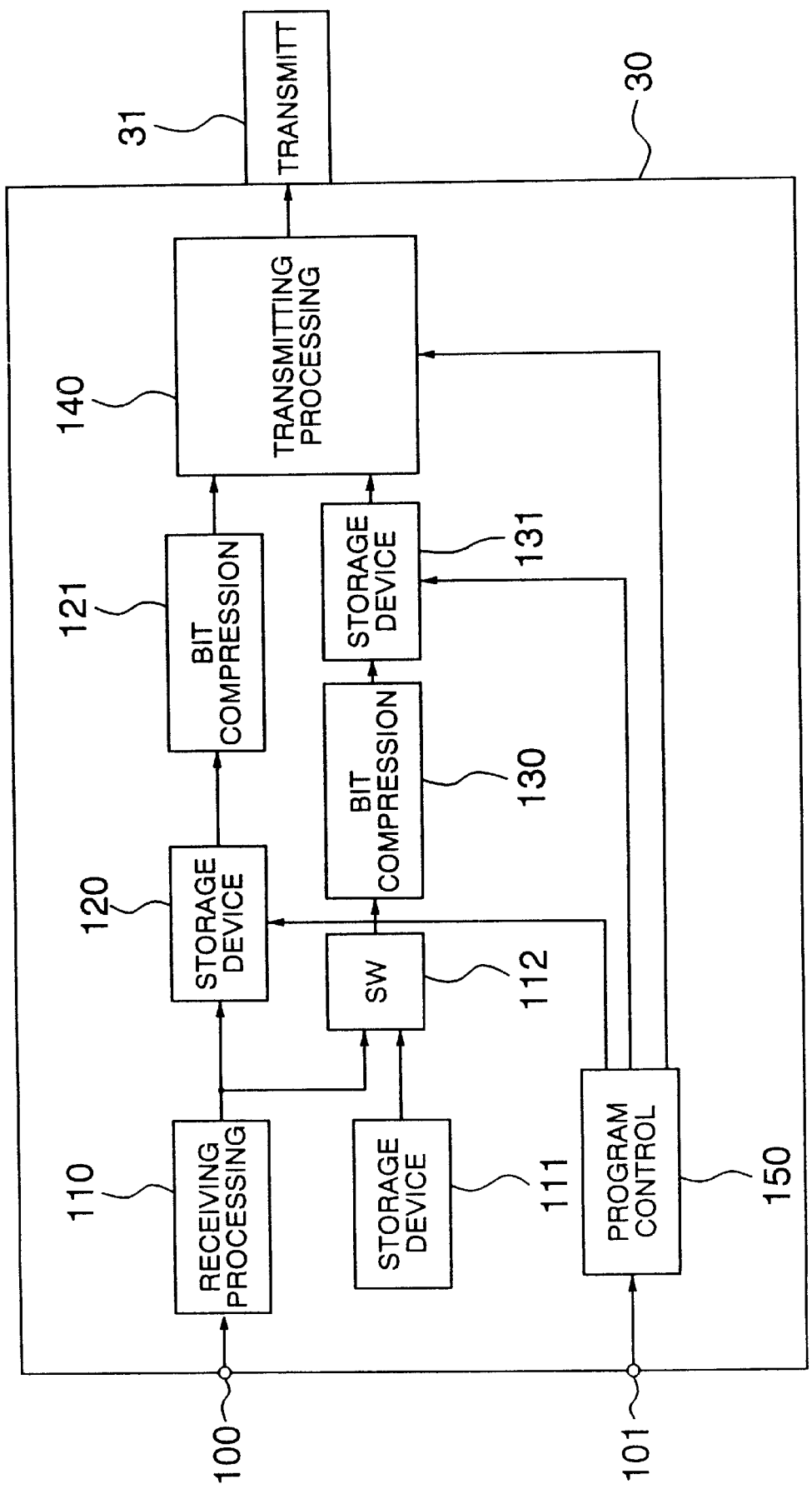
FIG. 2 is a block diagram showing an embodiment of a transmitter in FIG. 1.

Referring now to FIG. 2, details of the program distributor center 30 are shown in block form. In FIG. 2, input means 100 receives software transmitted from the software distributor 10 through a circuit and input means 101 receives a signal for control of, for example, a transmission program, the control signal being delivered out of the operation center 20.

Programs can be supplied from the software distributor 10 to the program distribution center 30 by using a circuit of, for example, optical fiber, coaxial line or satellite. As the case may be, programs can be stored in a storage medium such as a VTR cassette or an optical disk which can be transported. With the circuit used to supply software, the software is inputted to a receiving processing unit 110 through the input means 100. In the receiving processing unit 110, the signal inputted through the circuit is processed for demodulation, error correction or bit expansion as necessary. An output signal from the receiving processing unit 110 is inputted to a switching unit 112 and a storage device 120. In the storage device 120, the inputted software is stored and conserved in a medium of the storage device 120. When software stored in a storage medium such as a VTR cassette or an optical disk is transported from the software distributor 10 to the program distribution center 30, a storage device 111 complying with the transported medium is used for reproduction. A program reproduced from the storage device 111 is inputted to the switching unit 112.

The switching unit 112 is switched in accordance with signal input conditions to deliver an output signal which is inputted to a bit compression unit 130. The bit compression unit 130 performs digital compression such as a so-called MPEG2 to decrease the amount of data necessary for transmission. When data subject to digital compression is supplied from the software distributor 10, the bit compression unit 130 can be omitted. An output signal of the bit compression unit 130 is inputted to a storage device 131. The storage device 131 can use a medium capable of performing recording and reproduction, for example, a digital VTR, an optical disk or a magnetic disk.

A signal for control of, for example, a predetermined broadcasting program or a transmission program complying with a request by a subscriber is inputted from the operation center 20 to a program controller 150 through the input means. Program transmission control signals from the program controller 150 are inputted to the storage devices 120 and 131 and a transmitting processing unit 140. Software delivered out of the storage device 120 is inputted to a bit compression unit 121 so as to be subjected thereby to digital compression such as a so-called MPEG2, as in the case of the bit compression unit 130, to decrease the amount of data necessary for transmission. An output signal of the bit compression unit 121 is supplied to the transmitting processing unit 140. A signal delivered out of the storage device 131 is also fed to the transmitting processing unit 140.

When it is desired that software be transmitted as soon as supplied from the software distributor 10, the software, which has once been recorded on the storage device 120, is not reproduced and delivered but an input signal to the storage device 120 may be delivered to the bit compression unit 121 while being recorded on the storage device 120 as necessary.

When software supplied from the software distributor 10 is representative of data which has already been subjected to bit compression, there is no need of again passing the software through the bit compression unit 121.

The transmitting processing unit 140 performs encryption and addition of an error correction code as necessary and responds to a control signal from the program controller 150 to modulate needful software with a predetermined carrier frequency, thereby delivering a modulated output signal. The output signal of the transmitting processing unit 140 is inputted to a transmitter 31. The transmitter 31 transmits a signal targeting on the satellite 40 shown in FIG. 1.

Figure 3:
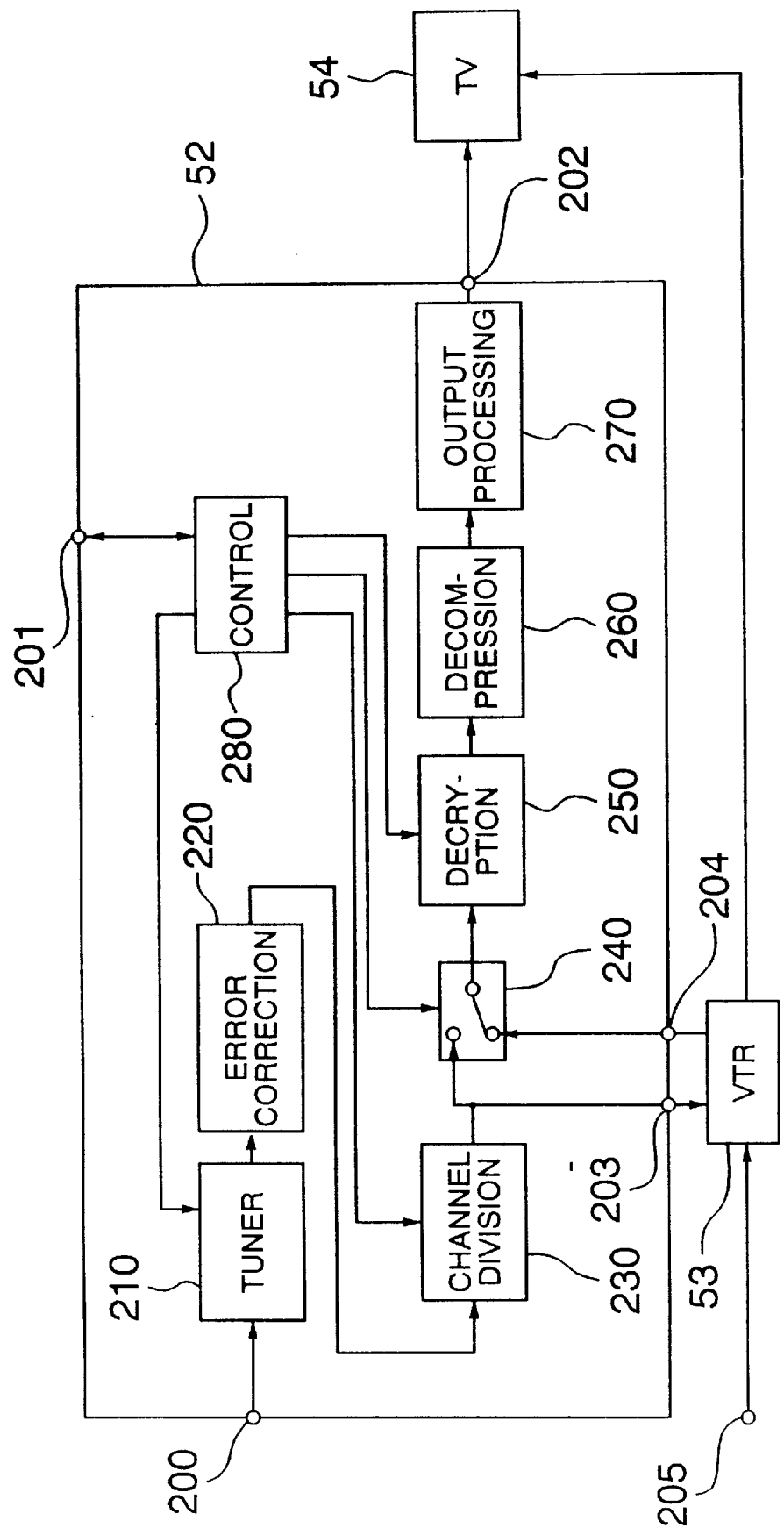
FIG. 3 is a block diagram showing an embodiment of a receiver in FIG. 1.

The receiver coder 52 in the subscriber 50 is concretely constructed as shown in FIG. 3. There are provided in FIG. 3 an input terminal 200 for receiving a signal from the receiver 51, an input/output terminal 201 for transmitting and receiving a signal which is used to make a request to the operation center for software and a signal which is necessary for knowing receiving conditions of chargeable broadcasting, an output terminal 202 for delivery of a decompressed signal, an output terminal 203 for delivery of a signal to the VTR, an input terminal 204 for receiving a signal from VTR to receiver decoder 52, an input terminal 205 for receiving a signal from the receiver 56 shown in FIG. 1, a tuner 210, an error correction unit 220, a channel divider 230, a switching circuit 240, a decryption circuit 250, a decompression circuit 260 for bit expansion, an output processing circuit 270, and a control circuit 280.

The receiver 51 receiving a signal from the satellite 40 delivers the receiving signal to the tuner 210 through the terminal 200. Responsive to a control signal from the control circuit 280, the tuner 210 selects a signal of a channel for a program the operator wants to see and demodulates the signal modulated by the transmitting processing unit 140 to deliver a demodulated signal to the error correction circuit 220. In accordance with an error correction code added by the transitting processing unit 140, the error correction circuit 220 corrects an error mainly caused in a circuit. An error-corrected signal is inputted to the channel divider 230. When a plurality of programs are transmitted on a single channel, the channel divider 230 responds to a control signal from the control circuit 280 as necessary to select and deliver a desired program.

The output signal of the channel divider 230 is inputted to the switching circuit 240 and the VTR 53 through the output terminal 203. In the VTR 53, an input signal received in the form of a digital bit stream is recorded and when reproducing, a reproduced signal having the same form as the input bit stream is inputted to the switching circuit 240 through the input terminal 204. Responsive to a control signal from the control circuit 280, the switching circuit 240 selects and delivers the signal from the channel divider 230 when the received signal is to be reconstructed but selects and delivers the signal from the input terminal 204 when the reproduced output signal from the VTR 53 is to be selected and delivered.

The output signal of the switching circuit 240 is supplied to the decryption circuit 250. In the decryption circuit 250, the signal encrypted by the transmitting processing circuit 140 is decrypted. A signal having its cipher decrypted and being delivered out of the decryption circuit 250 is fed to the decompression circuit 260 in which the signal subjected to bit compression by the bit compression circuit 121 or 130 shown in FIG. 2 or by the software distributor 10 shown in FIG. 1 is decompressed and expanded.

A signal subjected to bit expansion by the decompression circuit 260 is inputted, as a component signal consisting of a brightness signal and two color difference signals, to the output processing circuit 270. In the output processing circuit 270, the inputted two color difference signals are subjected to quadratic two-phase modulation so as to be converted into a carrier color signal, the resulting carrier color signal being delivered along with the brightness signal. The output signal is inputted to the television 54 through the output terminal 202. To meet the case where only a composite input terminal is provided for the television 54, the output processing circuit 270 may add the brightness signal to the carrier color signal to produce a composite signal which is delivered. Further, both of a signal consisting of the brightness signal and carrier color signal and a composite signal may be delivered.

A signal delivered out of the receiver 56 and inputted through the input terminal 205 is recorded on the VTR 53 as necessary and a reproduced signal is delivered to the television 54. Alternatively, when recording of the input signal is not effected, the input signal or a signal equivalent thereto is delivered to the television 54.

Figure 4:
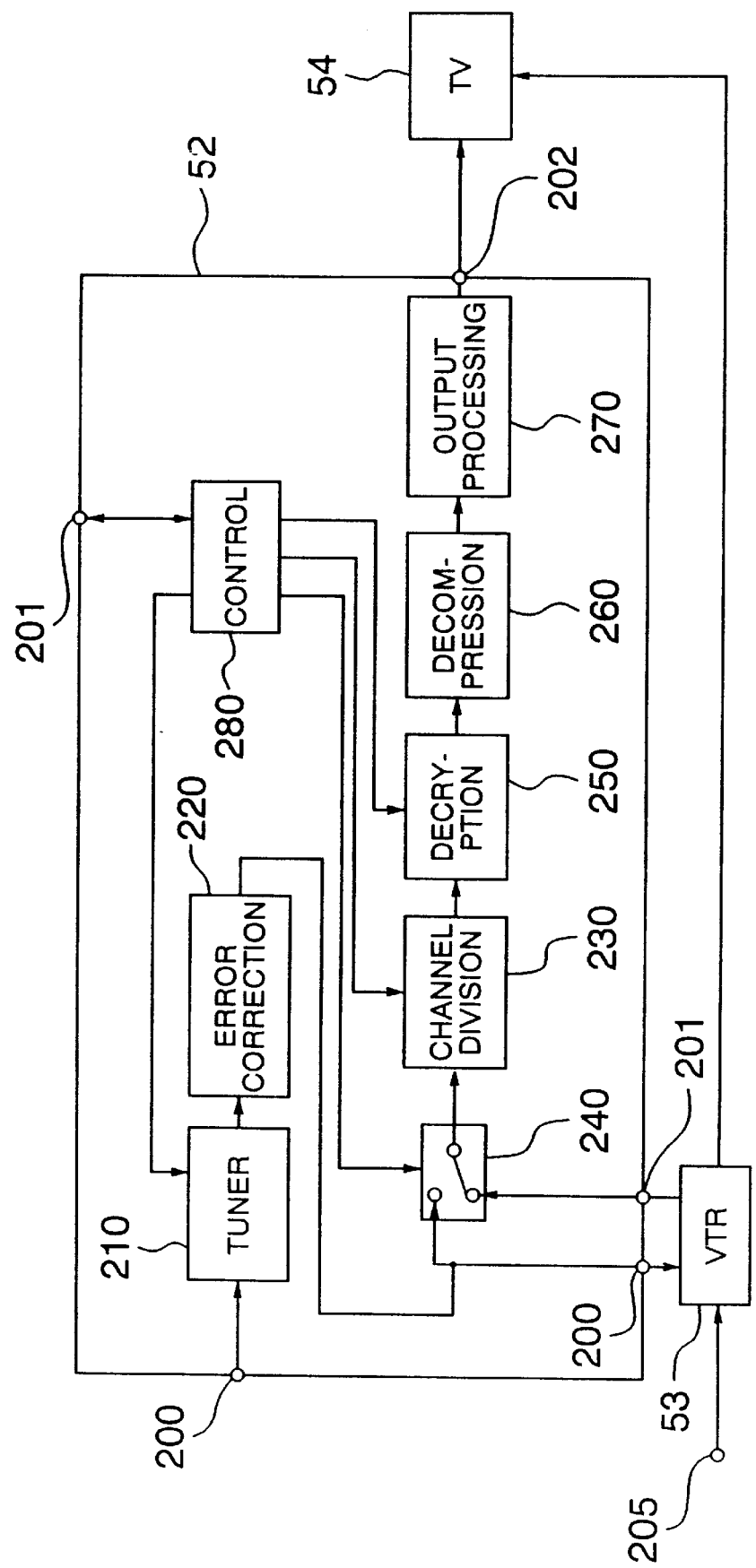
FIG. 4 is a block diagram showing another embodiment of the receiver in FIG. 1.

Referring now to FIG. 4, there is illustrated another specific embodiment of the receiver decoder shown in FIG. 1. In FIG. 4, part of the embodiment shown in FIG. 3 is improved. In the embodiment shown in FIG. 4, components identical to those of FIG. 3 are designated by identical reference numerals.

The embodiment shown in FIG. 4 differs from the embodiment shown in FIG. 3 in that a channel divider 230 is so moved as to follow a switching circuit 240. Namely, an output signal of an error correction circuit 220 is inputted to a VTR 53 and the switching circuit 240 and an output signal of the VTR 53 is inputted to the switching circuit 240. Then, an output signal of the switching circuit 240 is sent to the channel divider 230.

In the embodiment shown in FIG. 4, a plurality of (inclusive of one) programs transmitted on a single channel which is unaffected by channel division are recorded on the VTR 53. An output signal of the VTR 53 is inputted to the channel divider 230 through the switching circuit 240 and one program is selected and delivered. In this case, a plurality of programs can be recorded on the single VTR at a time.

Next, a multiplexed communication system of encrypted data according to the present invention will be described by way of a system utilizing a communication satellite.

A user about to receive a multi-channel chargeable digital broadcasting service first applies for admission to the program distribution center, i.e., a broadcasting station by mail or through the medium of a communication circuit and at the same time, pays an entrance fee through, for example, a banking organ cooperative with the broadcasting station. After confirming the application for admission, the broadcasting station assigns a user identifying number (hereinafter called a user ID) to the user and sends to the user, for example, an exclusive terminal registered with the user ID or an exclusive IC card registered with the user ID. The user opens a receiving terminal by using the sent exclusive terminal or mounting the exclusive IC card to a general-purpose receiving terminal and is now ready to receive the service.

For example, a multi-channel chargeable digital broadcasting system utilizing an information compression technique can make use of a great number of channels in the broadcasting system to offer a new service such as time shift broadcasting in which identical programs are started to be broadcast on a plurality of channels at different times which are at constant time intervals or video on demand (hereinafter called a VOD) in which a program is broadcast at a request by a receiving terminal side. In addition, the broadcasting system utilizes a signal in the form of a digital signal which is not deteriorated in the course of transmission and reception and therefore, it can provide information of high quality.

However, immunity from deterioration during transmission/reception suggests that a duplicate having the same quality as that of an original can be obtained with ease and there is a possibility that when many duplicates are made without permission by a copyright holder, a copyright of the signal distributor may be infringed or the normal management of chargeable broadcasting may be broken down. Accordingly, in order to protect a copyright of the signal distributor and ensure the normal management of chargeable broadcasting, the broadcasting station is required to scramble a program to be transmitted, that is, encrypt a transmitting signal.

Having the above in mind, the broadcasting station scrambles signals for movies, sports relay broadcast and the like and transmits the resulting signals. When receiving a scrambled signal, a communication satellite performs the processing such as conversion of carrier frequencies of receiving and transmitting frequencies and transmits a signal to a required service area including a receiving terminal. The receiving terminal being in receipt of an electric wave from the communication satellite (an exclusive terminal supplied from the broadcasting station or an opened receiving terminal mounted with an exclusive IC card) releases the signal from scramble to permit a program to be viewed.

Then, the broadcasting station researches audience conditions of the chargeable program at the receiving terminal through, for example, a communication circuit connecting the broadcasting station and the receiving terminal, charges a fee, for example, monthly, every channel as contracted or for watched programs and collects an audience fee through a banking organ.

Figure 5:
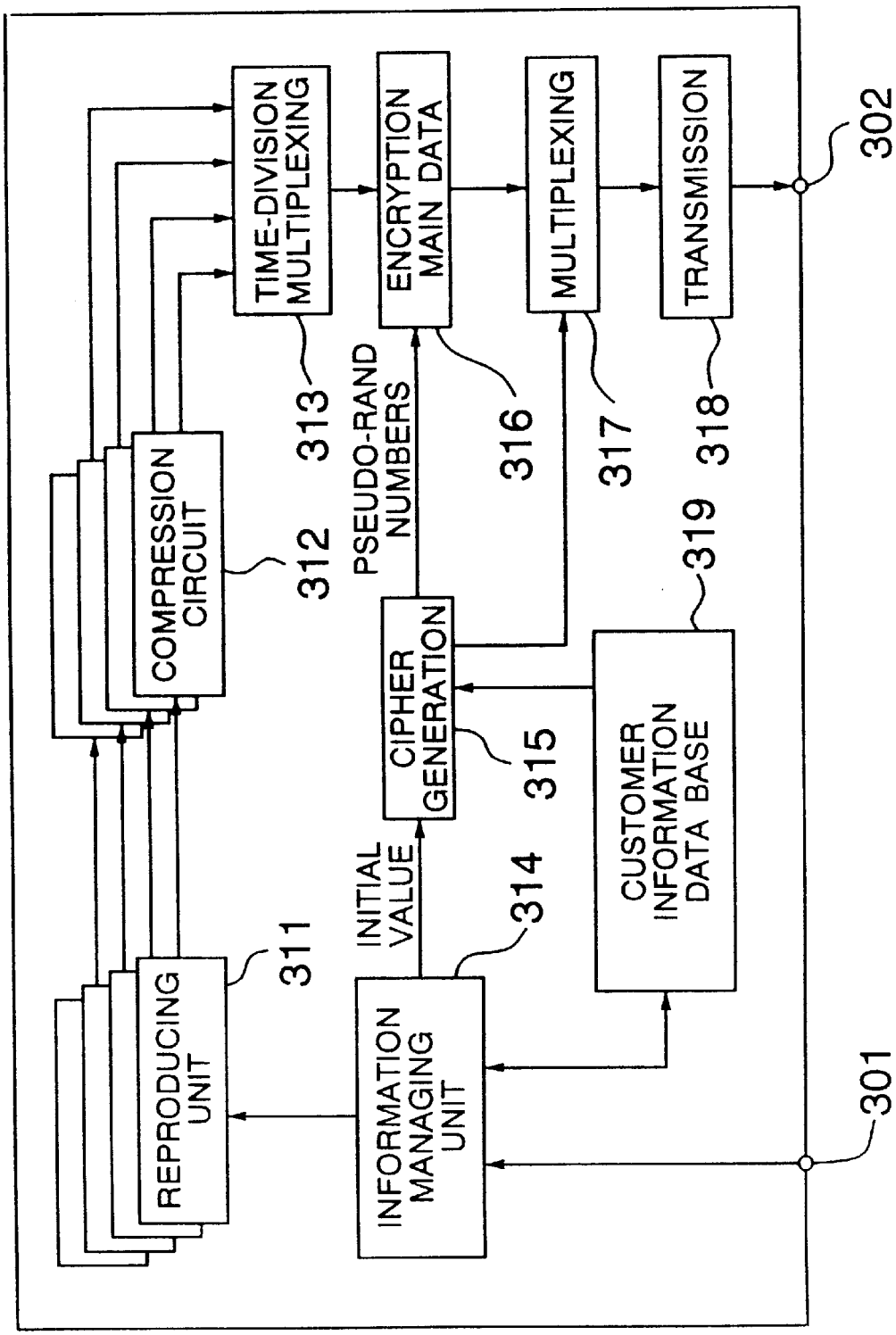
FIG. 5 is a block diagram showing an embodiment of construction of a circuit for transmitting a transmission signal by multiplexing and encrypting the transmission signal in the transmitter of FIG. 1.

Referring now to FIG. 5, an example of the construction of a broadcasting station comprised of the operation center 20 and program distribution center 30 as shown in FIG. 1 will be described.

In FIG. 5, an input terminal 301 receives, through a bidirectional communication circuit, an application for admission or a request for program by a receiving terminal, for example, the receiver decoder 52 or telephone set 55 of FIG. 1, or information on audience conditions necessary for charging. Through an output terminal 302, a compressed multiplexed program is transmitted to the communication satellite 40 of FIG. 1.

In the multi-channel chargeable digital broadcasting system capable of offering a variety of new services by utilizing, for example, the communication satellite, the VCD is taken as an example of service and the internal construction of the broadcasting station comprised of the operation center 20 and program distribution center 30 of FIG. 1 will be described herein with reference to FIG. 5.

When a request from the receiving terminal is received through the input terminal 301, an information managing unit 314 first retrieves a customer information data base 319 and checks whether a user who has transmitted the request is a normal subscriber and checks paying conditions of audience fee. When a program is permissible for offering to the user who has transmitted the request, the requested program is reproduced using a reproducing unit 311. The program reproduced by the reproducing unit 311 is compressed by a compression circuit 312 through an optimum compression method meeting characteristics of the information, for example, an MPEG scheme if the program is of a video or audio program, and is time-division multiplexed with a compression signal of a program requested by another user by means of a time-division multiplexing circuit 313.

The information managing unit 314 manages a predetermined initial value for generating a key signal necessary for encryption of a signal, delivers the initial value to a cipher generating circuit 315 and causes the customer information data base 319 to deliver an arithmetic formula and an identifying code to the cipher generating circuit 315. Typically, the same arithmetic formula may be used for individual subscribers but by changing the arithmetic formula every constant period or using arithmetic formulas which are different for individual subscribers, safety of the system can be enhanced. The cipher generating circuit 315 performs operation on the basis of the received initial value received from the information managing unit 314 pursuant to the arithmetic formula from the customer information data base 319 to calculate a key signal and besides, generates data necessary for encryption of the signal, for example, pseudo-random numbers.

On the basis of the above pseudo-random numbers, an encryption circuit 316 encrypts the signal by performing, for example, exclusive ORing of the compressed multiplexed signal and the pseudo-random numbers or application of line rotation to the compressed multiplexed signal and delivers the resulting signal as main data. Subsequently, a multiplexing circuit 317 multiplexes the main data with the initial value of the key signal, identifying code of the user and program information. Although not described herein, encryption of the initial value of cipher, the identifying code and the program information which are subjected to multiplexing by the multiplexing circuit 317 can also be effected for the sake of protecting privacy of the customer or preventing wrong decryption of cipher, and hence safety of the system can be further improved.

A transmitting circuit 318 carries out addition of an error correction code and packeting of data as well as the modulation processing necessary for transmission of data to the communication satellite 40 and then transmits the resulting data to the communication satellite 40 through the output terminal 302.

Figure 6:
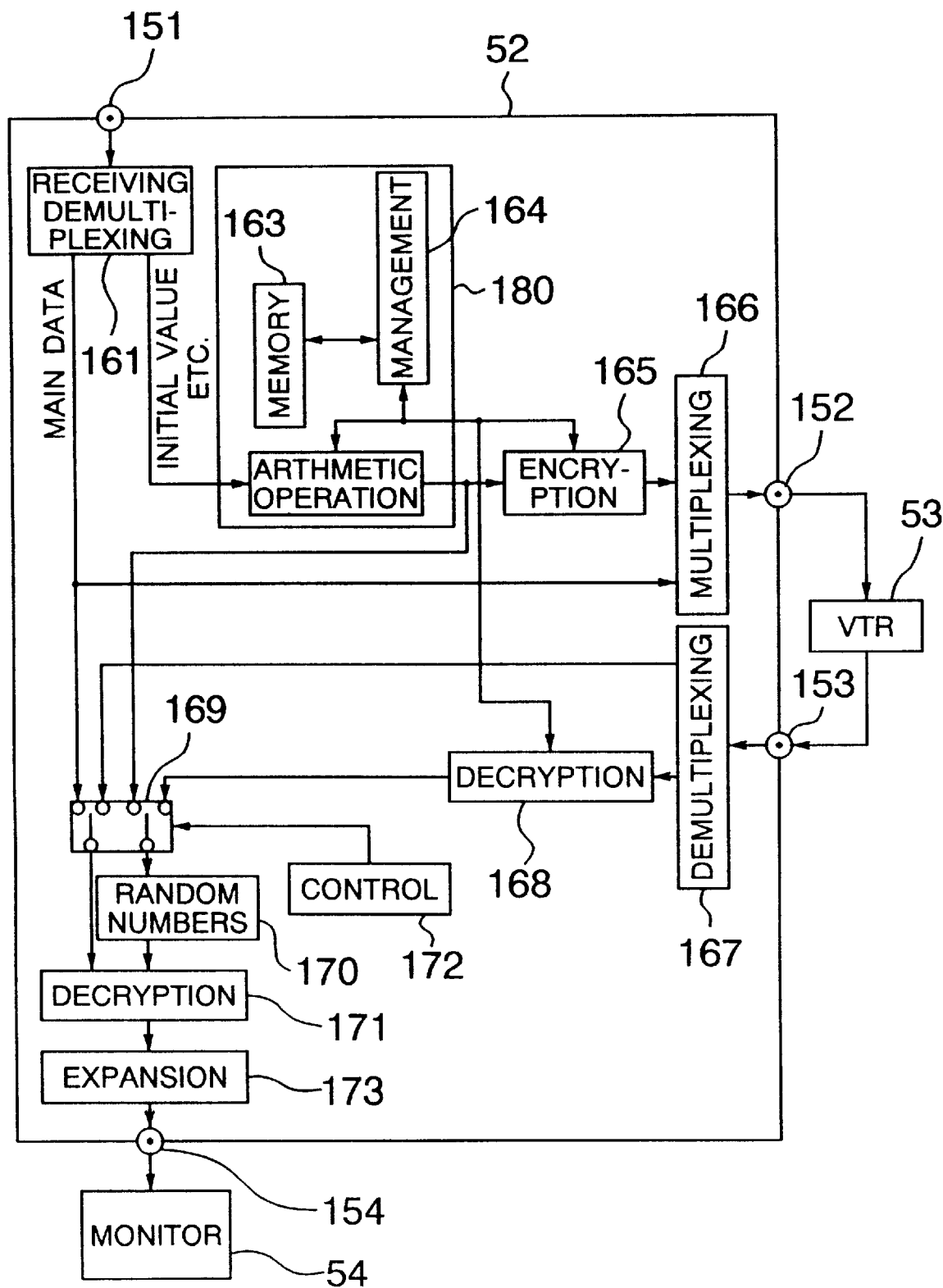
FIG. 6 is a block diagram showing an embodiment of a receiver for receiving multiplexed encrypted data transmitted from the transmitter shown in FIG. 5.

Referring now to FIG. 6, an example of the internal construction of a multi-channel chargeable digital broadcasting receiving terminal utilizing the communication satellite will be described.

In FIG. 6, a receiving terminal corresponding to the receiver decoder 52 of FIG. 1 receives a signal from the broadcasting station and performs the signal processing. An input terminal 151 receives a signal from the communication satellite or the like. The signal is delivered to the VTR (data storage unit) 53 through an output terminal 152. An input terminal 153 receives a signal delivered out of the VTR. An output terminal 154 delivers the signal transmitted from the communication satellite or the like or a signal in the form of a video or audio signal as a result of decryption of the signal delivered out of the VTR.

A signal responsive to a transmitted request is transmitted from the broadcasting station through the communication satellite 40 and is inputted to the input terminal 151 of the receiving terminal 52 mounted with an exclusive IC card 180. Although not illustrated in FIG. 6, an antenna installed, for example, in a room or outdoors is needed for receiving an electric wave from the communication satellite 40 and the signal received by the antenna is supplied to a receiving demultiplexing circuit 161 through the input terminal 151. The receiving demultiplexing circuit 161 first demodulates the receiving signal and corrects an error of data or the like caused in a halfway communication circuit or the like. Further, a user identifying code, an initial value of a key signal for decryption of a cipher of main data, which are superimposed on the signal, are demultiplexed and extracted from the encrypted main data. The initial value and the like are delivered to the exclusive IC card 180 and the main data is delivered to a multiplexing circuit 166 and a selector 169.

The user identifying code inputted to the exclusive IC card 180 is collated with a user ID stored in a memory 163 so that a managing circuit 164 may confirm signal reception permission, confirm the requested program and extract the initial value of the key signal to the objective program Then, an arithmetic circuit 162 operates the initial value of the key signal to the objective program pursuant to specified algorithm to calculate the key signal on the basis of the initial value of the key signal. The arithmetic circuit 162 is precedently set with the arithmetic algorithm which is identical to algorithm used in the cipher generating circuit 315 of FIG. 5 to calculate the key signal from the initial value thereof.

The key signal to the cipher is not transmitted from the broadcasting station but only the initial value of the key signal, which is a compressed multiplexed signal, is transmitted and the key signal to the cipher is calculated through the arithmetic operation in the exclusive IC card 180. This system permits a third person not having the exclusive IC card 180 to receive the signal transmitted from the broadcasting station but does not permit the third person to decrypt the cipher. Therefore, this system is effective to prevent wrong reception. Further, since the exclusive IC card 180 is detachably mounted to the receiving terminal 52 and is exchangeable, identical signals can be encrypted in accordance with different kinds of algorithm. Moreover, since the exclusive IC card in the receiving terminal 52 has charge of all functions including management of the user ID, part of the receiving terminal excepting the exclusive IC card can be made in a general-purpose form and therefore, the use of the exclusive IC card gives rise to advantages that the cost can be suppressed and the broadcasting station need not manage the receiving terminal.

The key signal calculated by applying arithmetic operation to the initial value in the arithmetic circuit 162 is delivered to an encryption circuit 165 and the selector 169. The encryption circuit 165 encrypts the key signal by using the user ID delivered out of the managing circuit 164 inside the exclusive IC card 180. Specifically, the user ID is represented by, for example, a digital binary code and subjected to the processing such as exclusive-ORing with the inputted key signal, and the resulting signal is delivered. It is to be noted that the aforementioned user ID card is allotted to an individual who has made a contract with the broadcasting station and remains unchanged even when the exclusive IC card is exchanged.

The key signal encrypted by the encryption circuit 165 is multiplexed with the main data delivered out of the receiving demultiplexing circuit 161 by means of the multiplexing circuit 166 and the resulting signal is delivered out of the output terminal 152. By recording the signal delivered out of the output terminal 152 on the VTR 53, storage and conservation of the received signal can be ensured.

A signal delivered out of the VTR 53 is inputted to a demultiplexing circuit 167 through the input terminal 153.

In the demultiplexing circuit 167, the encrypted key signal and main data which have been multiplexed for recording on the VTR 53 are demultiplexed and the key signal is delivered to a first decryption circuit 168 while the main data being delivered to the selector 169.

In the first decryption circuit 168, the key signal encrypted by the encryption circuit 165 is decrypted. In the present embodiment, the encryption circuit 165 effects encryption by calculating exclusive-ORing of the key signal with the user ID stored in the memory 163. Accordingly, the first decryption circuit 168 decrypts the encrypted key signal by also calculating exclusive-ORing of the user ID stored in the memory 163 with the inputted encrypted key signal.

Even when the exclusive IC card 180 is changed and arithmetic algorithm is changed during storage of data in the VTR 53, decryption of the main data does not face any problem in the present system because the user ID remains unchanged and the signal encrypted by the encryption circuit 165 is the key signal which does not require any arithmetic operation in the arithmetic circuit 162. Further, when it comes to preparing a duplicate of a receiving signal recorded tape by using a plurality of VTR's, the normal user intending to prepare a duplicate for backup of a program received by himself or herself is allowed to perform correct decryption if using the exclusive IC card supplied from the broadcasting station. But when a third person who is given a duplicate prepared for a wrong purpose such as transfer uses an exclusive IC card different from the above, a correct decryption result cannot be obtained. Accordingly, a copyright holder can be prevented from suffering damage by a wrong duplicate of a receiving signal.

The key signal decrypted by the first decryption circuit 168 is inputted to the selector 169. Responsive to a command from a control circuit 172, the selector 169 selects one of the main data delivered out of the receiving demultiplexing circuit 161 and main data delivered out of the demultiplexing circuit 167 as well as one of the key signal delivered out of the arithmetic circuit 162 and key signal delivered out of the first decryption circuit 168. More particularly, when the receiving demultiplexing circuit 161 receives a signal requested by a user, the selector 169 responsive to the control circuit 172 selects and delivers the main data delivered out of the receiving demultiplexing circuit 161 and the key signal delivered out of the arithmetic circuit 162 but when the receiving demultiplexing circuit 161 does not receive any signal and a signal reproduced from the VTR 53 is inputted through the input terminal 153, the selector 169 selects and delivers the main data delivered out of the demultiplexing circuit 167 and the key signal delivered out of the first decryption circuit 168.

On the basis of the key signal delivered out of the selector 169, a random number generating circuit 170 generates pseudo-random numbers by using the same procedure (or the same table) as that used by the cipher generating circuit 315 of FIG. 5 and delivers the resulting signal to a second decryption circuit 171.

The second decryption circuit 171 decrypts the main data delivered out of the selector 169 by using the pseudo-random numbers delivered out of the random number generating circuit, that is, releases scramble applied by the broadcasting station. Decryption of the main data is effected by, for example, calculating exclusive-ORing of the pseudo-random numbers generated from the random number generating circuit 170 with the main data delivered out of the selector 169 or decrypting line rotation based on the pseudo-random numbers.

A signal released from scrambling by means of the second decryption circuit 171 is subjected to the expansion processing inverse to the compression processing applied by the compression circuit 312 of FIG. 5 and the signal processing necessary for its delivery to the outside by means of an expansion circuit 173. More specifically, in the case of a signal compressed through MPEG scheme, the signal is expanded by an MPEG decoder, subjected to the signal processing such as D/A conversion and scanning line conversion, delivered through the output terminal 154 and displayed on the monitor 54.

As described above, according to the aforementioned system of the present embodiment, by encrypting a key signal calculated from an initial value of the key signal transmitted from the broadcasting station by using a user ID, storage of a scrambled signal can be allowed only when the user himself or herself intends to back up a signal received by himself or herself. Decryption of the signal can be permitted unless a contract made with the broadcasting station is canceled, that is, so long as the user ID is available. Further, since the stored signal cannot be subjected to decryption, expansion inverse to compression and display in the absence of an exclusive IC card stored with a user ID, distribution of a duplicate to a third person can be prevented. In other words, while a copyright or the like of a signal distributor is prevented from being infringed, decryption and storage of signals can be ensured.

When the number of signal receiving operations and hours thereof are stored by utilizing a memory provided in the receiving terminal 52 or the memory 163 inside the exclusive IC card 180 and the broadcasting station researches the communication circuit periodically or collects and researches the exclusive IC card 180, a fee can be charged to the receiving terminal 152 or the exclusive IC card 180 in accordance with utilization conditions. Further, signal receiving conditions such as, for example, audience conditions of program can be researched with ease.

Figure 7:
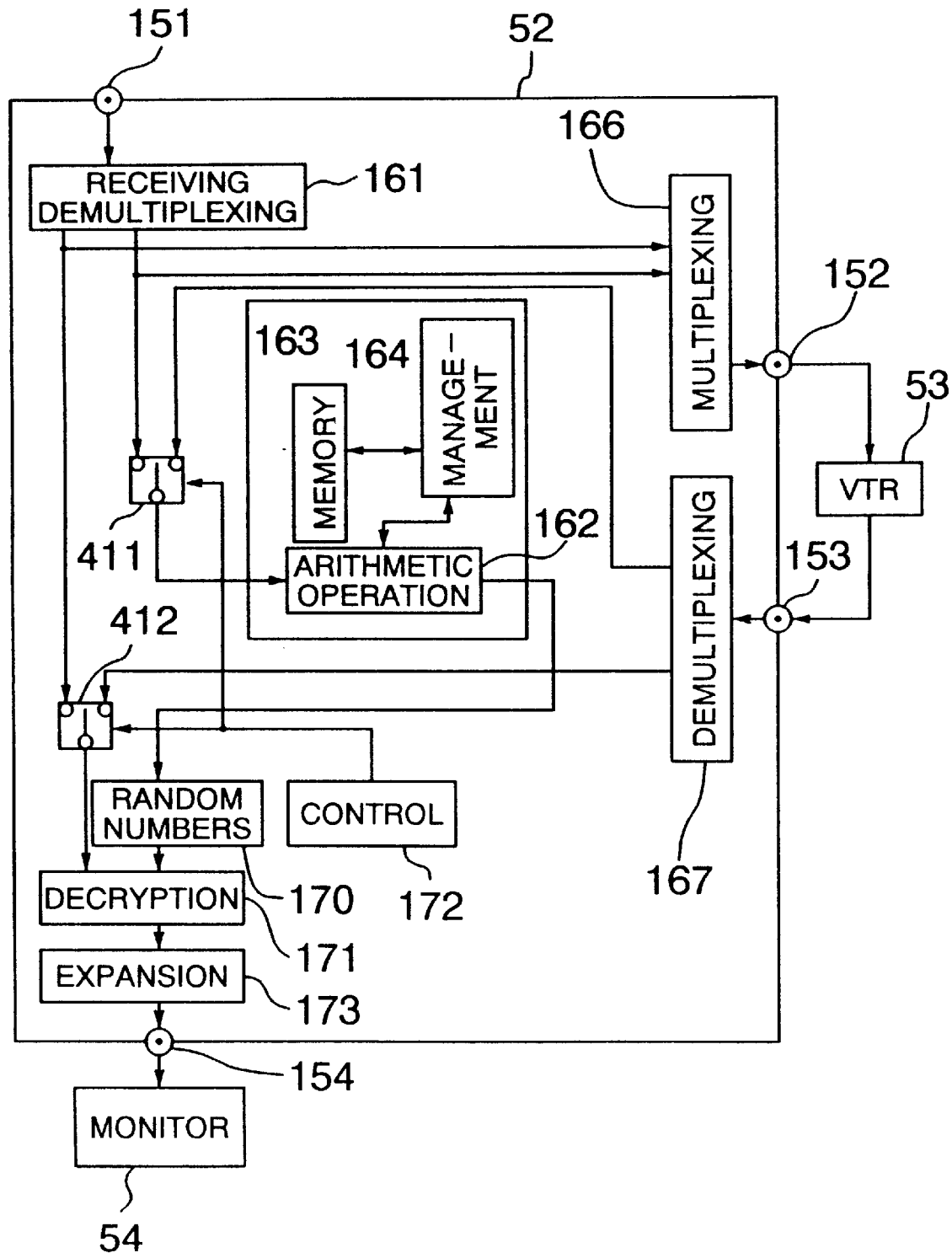
FIG. 7 is a block diagram showing another embodiment of the receiver for receiving multiplexed encrypted data transmitted from the transmitter shown in FIG. 5.

Referring now to FIG. 7, another embodiment of the present invention will be described. In the Figure, components identical to those of FIG. 6 are designated by identical reference numerals and will not be described for avoiding prolixity of explanation.

In FIG. 7, a first selector 411 responds to a command from a control circuit 172 to select one of an initial value of a key signal delivered out of a receiving signal demultiplexing circuit 161 and an initial value of a key signal delivered out of a demultiplexing circuit 167 and delivers a selected initial value. A second selector 412 also responds to a command from the control circuit 172 to select one of main data delivered out of the receiving demultiplexing circuit 161 and main data delivered out of the demultiplexing circuit 167 and delivers selected main data.

The receiving demultiplexing circuit 161 demodulates the received signal, performs the signal processing such as correction of an error of data caused in a halfway communication circuit and thereafter, demultiplexes and extracts a user identifying code, the initial value of the key signal for decryption of a cipher of the main data from the encrypted main data. Then, in the present embodiment, the user identifying code and initial value of the key signal are delivered to a multiplexing circuit 166 and the first selector 411 and the main data is delivered to the multiplexing circuit 166 and the second selector 412. Further, the main data and the initial value of the key signal and the like are multiplexed in the multiplexing circuit 166 and the resulting signal is delivered through an output terminal 152 so as to be recorded on the VTR 53, thereby permitting storage of the signal.

A signal delivered out of the VTR 53 is inputted to the demultiplexing circuit 167 in which individual signals multiplexed by the multiplexing circuit 166 are demultiplexed, and the initial value of the key signal and the like are delivered to the first selector 411 and the main data is delivered to the second selector 412. The first and second selectors 411 and 412 carries out an operation similar to that of the selector 169 shown in FIG. 6. More particularly, responsive to a command from the control circuit 172, the first and second selectors 411 and 412 select and deliver the initial value of the key signal and the main data delivered out of the receiving demultiplexing circuit 161, respectively, when the receiving demultiplexing circuit 161 receives a signal requested by the user but select and deliver the initial value of the key signal and the main data delivered out of the demultiplexing circuit 167, respectively, when the receiving demultiplexing circuit 161 does not receive any signal and a signal reproduced from the VTR 52 is inputted through an input terminal 153.

Like the embodiment of FIG. 1, in the exclusive IC card 180, a signal delivered out of the first selector 411 and representative of the initial value of the key signal and the like is collated with a user ID having individual information stored in a memory 163 so that a managing unit 164 may confirm signal reception permission, confirm the requested program and extract the initial value of the key signal to the objective program. An arithmetic circuit 162 operates the initial value of the key signal to the objective program pursuant to specified algorithm to calculate the key signal on the basis of the initial value of the key signal. Like the foregoing embodiment, the arithmetic circuit 162 is precedently set with the arithmetic algorithm which is identical to that used in the cipher generating circuit 315 of FIG. 5 to calculate the key signal from the initial value thereof.

Since the user ID is confirmed by being collated with the individual information transmitted from the broadcasting station and the key signal is then calculated in the exclusive IC card, calculation of the key signal is allowed only for a signal received by the user himself or herself and a signal received, recorded and stored by himself or herself and hence the copyright holder can be prevented from suffering disadvantage caused by a wrong duplicate.

Thereafter, as in the foregoing embodiment, the main data and the key signal calculated in the exclusive IC card are subjected to the signal processing such as generation of pseudo-random numbers, decryption of the cipher of the main data and expansion of the compressed signal in a pseudo-random number generating circuit 170, a decryption circuit 171 and an expansion circuit 173 and are then displayed on the monitor 54.

As described above, according to the system of the present embodiment, by recording the initial value of the key signal transmitted from the broadcasting station on the VTR along with the main data, decryption of the scrambled storage signal can be allowed only when the user views the signal received by himself or herself. But, in the system of the present embodiment, when the exclusive IC card is changed by changing the arithmetic formula delivered out of the customer data base 319, the initial value of the key signal recorded on the VTR remains unchanged and only the arithmetic algorithm in the arithmetic circuit 162 is changed, thus making it impossible to decrypt the main data. Therefore, in the system of the present embodiment, the period allowed for storage of signal is limited but similar effects to those y the foregoing embodiment can be obtained in connection with, for example, research of audience conditions and fee charge. Also, in the present embodiment, the receiving terminal can dispense with the encryption and decryption circuits for key signal and extraction of the user ID from the exclusive IC card, thereby attaining an advantage that the signal processing circuit can be reduced greatly in scale.

In the foregoing embodiments, the communication circuit on which a program is transmitted is described by way of the communication satellite but it may be practiced with other communication circuits, for example, a wire communication circuit using an optical fiber or a coaxial cable and a telephone circuit such as ISDN (integrated service digital network). Further, the data storage unit is not limited to the VTR but it may be realized with an optomagnetic disk unit, an optical disk unit, a hard disk unit or a large-capacity memory array. In addition, the signal to be transmitted is not limited to the video signal and it may be audio information, character information or game software provided that it is of a binary code signal, i.e., a digital signal, and the compression system in the broadcasting station (signal distributor) and the expansion system in the receiving terminal are not limited to the MPEG but compression algorithm most suited to a signal to be transmitted may be employed.

In the embodiments of FIGS. 6 and 7, the exclusive IC card is detachably mounted but a system is conceivable in which an exclusive IC card is made to be integral with the receiving terminal, that is, the receiving terminal is made to be an exclusive receiving terminal which has an identifying code and which has the function of managing the user identifying code and arithmetic operation of the key signal. In this case, allotment of a user ID to each receiving terminal and management of the receiving terminal by the broadcasting station are needed but on the other hand, the control circuits carried on both the exclusive IC card and the receiving terminal can advantageously be unified to a single control circuit. Conceivably, the receiving terminal and the data storage unit can be unified, that is, the VTR can be given the function of the receiving terminal and in this case, effects similar to those by the foregoing embodiments can be attained and besides, space reduction and wiring simplification can be ensured.

Figure 8:
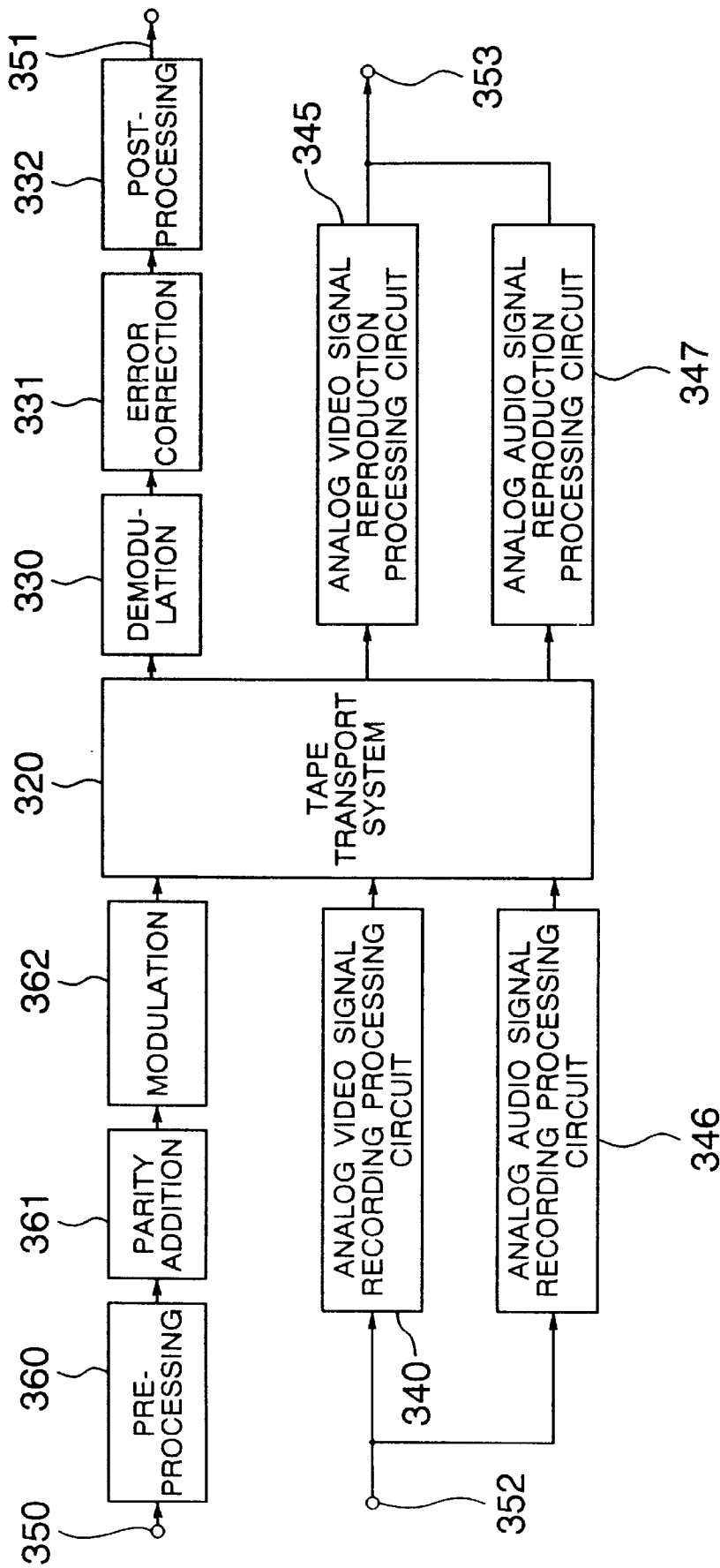
FIG. 8 is a block diagram showing an embodiment of a VTR arranged attachably in the receiver of FIG. 1.

Referring now to FIG. 8, there is illustrated in block form an embodiment of the VTR 53. In FIG. 8, there are provided an input terminal 350 for receiving a signal from the receiver decoder 52 shown in FIG. 1, an output terminal 351, an input terminal 352 for receiving a signal from the receiver 56 shown in FIG. 1 and an output terminal 353.

A signal received through the input terminal 350 is inputted to a pre-processing circuit 360. In the pre-processing circuit 360, the input digital signal is processed to undergo rearrangement for word unit processing as necessary so as to facilitate the succeeding signal processing. An output signal of the pre-processing circuit 360 is inputted to a parity adding circuit 361. In the parity adding circuit 361, a parity code for correcting an error caused in a tape transport system 320 is added. An output signal of the parity adding circuit 361 is inputted to a modulation circuit 362. In the modulation circuit 362, the digital signal is modulated into a form suitable for the tape transport system 320. Reported as examples of modulation systems are NRZ, NRZI, 8–10 conversion, MFM and M2. A modulated signal is inputted to the tape transport system 320 so as to be recorded on a magnetic tape.

During reproduction, a reproduced signal is inputted to a demodulation circuit 330 and is demodulated correspondingly to the modulation circuit 362. An output signal of the demodulation circuit 330 is inputted to an error correction circuit 331 so as to be corrected for an error caused in the tape transport system 320 on the basis of the parity code added by the parity adding circuit 361. An output signal of the error correction circuit 331 is inputted to a post-processing circuit 332 so as to be subjected to the processing inverse to that applied by the pre-processing circuit 360 and a signal having the same form as that of the signal inputted through the input terminal 350 is delivered through the output terminal 351. The signal delivered out of the output terminal 351 is inputted to the receiver decoder 52 shown in FIG. 1.

As shown in the embodiment of FIG. 8, there is no need of providing the bit compression circuits 121 and 130 as shown in FIG. 2 inside the VTR 53 and therefore a digital signal recording VTR of small circuit scale can be realized. In addition, the VTR need not have the internal bit compression circuits but the software distributor 10 or the program distribution center 30 may have the bit compression circuit and therefore, a bit compression circuit of high performance can be used, though the circuit scale becomes large and the cost rises, with the result that a relatively large bit compression ratio can be obtained to decrease the data rate of a digital signal to be transmitted. Accordingly, the VTR 53 used by the subscriber can ensure high quality, low cost and long-term recording.

An analog signal from the receiver unit 56 is inputted through the terminal 352 and supplied to an analog video signal recording processing circuit 340 and an analog audio signal recording processing circuit 346. Here, the signal processing pursuant to, for example, VHS standard, β standard or 8-millimeter VTR standard is carried out. A processed signal is inputted to the tape transport system 320. In the tape transport system 320, the signal is recorded in accordance with a corresponding format as in the case of the conventional VTR.

During reproduction, a signal reproduced from the tape transport system 320 is inputted to an analog video signal reproduction processing circuit 345 and an analog audio signal reproduction processing circuit 347 which apply to the signal the reproduction signal processing corresponding to the analog video signal recording processing circuit 340 and the reproduction signal processing corresponding to the analog audio signal recording processing circuit 346, respectively. A needful reproduced signal is inputted to the television 54 shown in FIG. 1 through the output terminal 353. Through this, the digital broadcasting and the conventional analog broadcasting can be recorded using the same tape transport system.

Figure 9:
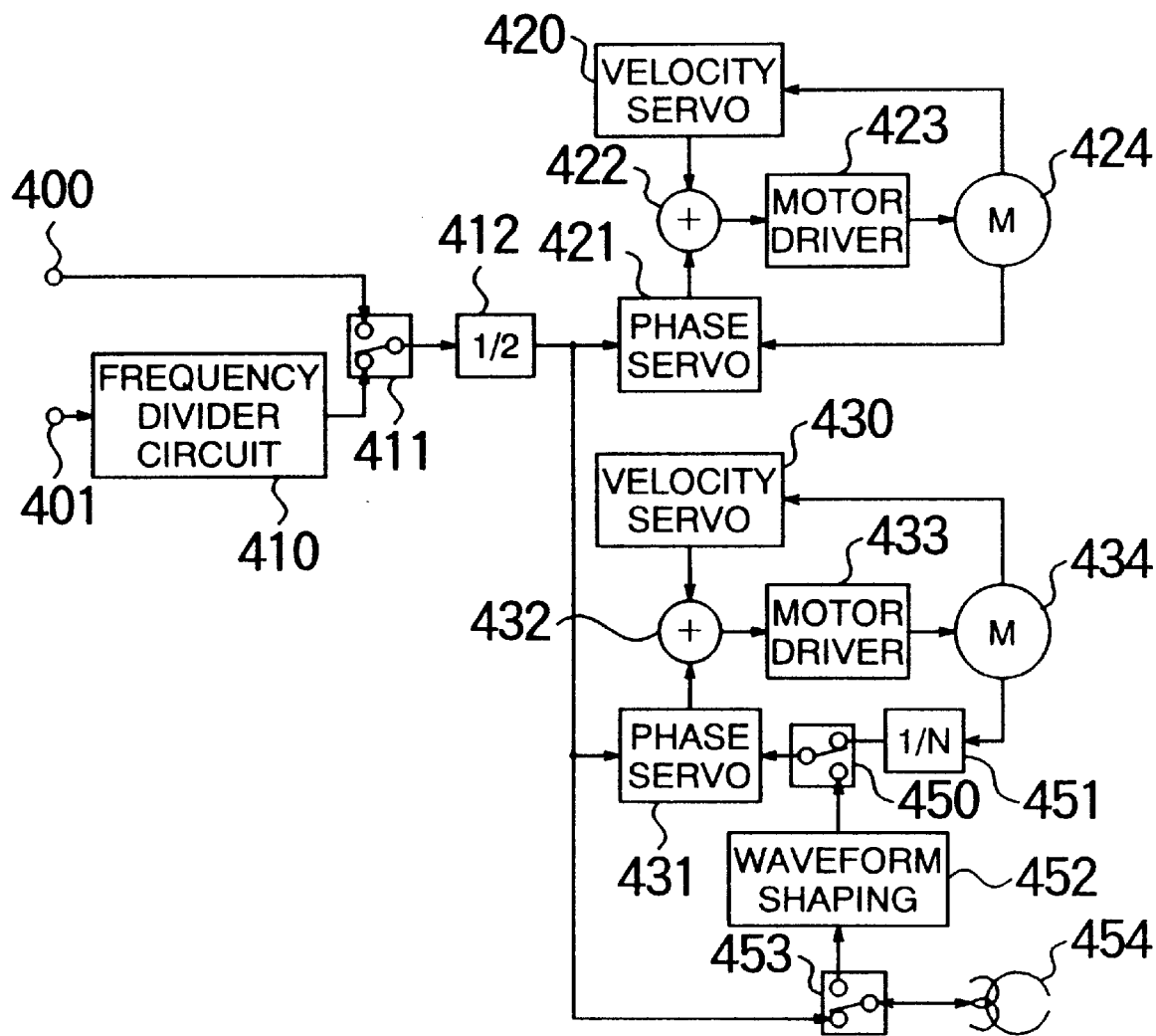
FIG. 9 is a block diagram showing an embodiment of a control circuit of the VTR shown in FIG. 8.

Referring now to FIG. 9, there is illustrated in block form an example of a servo circuit for controlling a cylinder (included in the tape transport system 320 in FIG. 8) and a capstan (also included in the tape transport system 320 in FIG. 8) which constitute the tape transport system.

In FIG. 9, the mode of recording an analog signal will first be described. In the case of recording an analog signal, a vertical synchronizing signal is inputted through a terminal 400. The vertical synchronizing signal is separated in the analog video signal recording processing circuit 340 shown in FIG. 8. The vertical synchronizing signal inputted through the terminal 411 is supplied to a switching circuit 411. In this mode, the switching circuit 400 delivers the vertical synchronizing signal inputted through the terminal 400. The signal delivered out of the switching circuit 411 is supplied to a ½ frequency divider circuit 412 so as to be subjected to ½ frequency division. A ½ frequency divided signal is sent to a phase servo circuit 421 of the cylinder system and phase-servo circuit 431 and switching circuit 453 of the capstan system.

A cylinder motor 424 is rotated by a motor driver 423. The cylinder motor 424 is provided with a sensor for detecting rotation frequency and rotation phase. A rotation frequency detected by the cylinder motor 424 is supplied to a velocity servo circuit 420. Responsive to the rotation frequency supplied from the cylinder motor 424, the velocity servo circuit 420 delivers a signal representative of a difference between the detected rotation frequency and a predetermined frequency. The difference signal is supplied to an adder circuit 422.

A rotation phase detected by the cylinder motor 424 is supplied to the phase servo 421. The phase servo 421 compares a signal supplied from the ½ frequency divider circuit 412 with the phase of the cylinder motor and delivers a signal representative of a difference therebetween. The output signal is supplied to the adder circuit 422 and added with the difference signal delivered out of the velocity servo. An output signal of the adder circuit 422 is supplied to the motor driver 423 to control the cylinder motor 422 such that the cylinder motor 422 is phase-locked with the signal supplied from the ½ frequency divider circuit 412. The velocity servo 420 controls the rotation frequency of the cylinder motor 424 to a constant value and the phase servo 421 performs fine control of even the phase of the cylinder motor 424.

The capstan system operates in substantially the same manner. A capstan motor 434 is rotated by a motor driver 433. The capstan motor 434 detects its rotation frequency which is supplied to a velocity servo circuit 430. The velocity servo circuit 430 compares the rotation frequency of the capstan motor 434 with a predetermined frequency and delivers a difference signal which is supplied to an adder circuit 432.

The rotation frequency of the capstan motor 434 is supplied to a 1/N frequency divider circuit 451. A frequency divided signal is fed to a switching circuit 450. In this mode, the switching circuit 450 is so transferred as to deliver the signal from the 1/N frequency divider circuit 451. The output signal of the switching circuit 450 is supplied to the phase servo circuit 431. The phase servo circuit 431 compares a phase of the signal from the ½ frequency divider circuit 412 with that of the input signal from the switching circuit 450 and delivers a difference signal to the adder circuit 432.

The adder circuit 432 adds the difference signal from the velocity servo circuit 430 and the difference signal from the phase servo circuit 431 to generate a sum signal which is delivered to the motor driver. The motor driver controls the capstan motor 434 such that the capstan motor 434 is phase locked with the signal from the ½ frequency divider circuit 412.

Further, the signal of ½ frequency divider circuit 412 fed to the switching circuit 453 is so selected thereby as to be supplied to a control head 454, with the result that a control signal is written onto a magnetic tape.

During reproduction, a reference signal is inputted through a terminal 401 and supplied to a frequency divider circuit 410. The frequency divider circuit 410 divides the frequency of the input reference signal to deliver a signal of the same frequency as that of the vertical synchronizing signal during recording. The output signal of the frequency divider circuit 410 is supplied to the switching circuit 411. In this mode, the switching circuit 411 selects and delivers the output signal of the frequency divider circuit 410. The output signal of the switching circuit 411 is supplied to the ½ frequency divider circuit 412 and a resulting ½ frequency-divided signal is supplied to the phase servo circuits 421 and 431.

The cylinder system operates in the same way as that for recording and the cylinder is phase locked with the input signal from the ½ frequency divider circuit 412.

The capstan system will now be described. During reproduction, the control signal written during recording is reproduced from the magnetic tape by way of the control head 454 and supplied to the switching circuit 453. During reproduction, the switching circuit 453 delivers the reproduction signal from the control head 454 to a waveform shaping circuit 452. In the waveform shaping circuit 452, the waveform of the input signal is shaped by, for example, being passed through a comparator. A shaped signal is fed to the switching circuit 450 and in the reproduction mode, the switching circuit connects the signal from the waveform shaping circuit 452 to the phase servo circuit 431. The phase servo circuit 431 carries out control operation such that the control signal on the magnetic tape is phase locked with the signal from the ½ frequency divider circuit 412. Through this, the magnetic head having the magnetic tape carried on a cylinder can be scanned at the same phase for both recording and reproduction operations and the signal on the magnetic tape can be reproduced.

Operation for controlling the cylinder and capstan carried out when an analog signal is inputted has been described. Operation of the servo circuit shown in FIG. 9 carried out when a digital signal is inputted through the terminal 350 in the embodiment of FIG. 8 will now be described.

During recording, a reference signal is inputted through the terminal 401 and supplied to the frequency divider circuit 410. The frequency divider circuit divides the frequency of the input signal to a suitable value and a frequency divided output signal is fed to the switching circuit 411. When the VTR 53 is used for recording/reproducing the digital signal, the switching circuit 411 selects and delivers the signal of the frequency divider circuit 410. The output signal of the switching circuit 411 is fed to the ½ frequency divider circuit 412. During recording, as in the case of recording of an analog signal, the cylinder and capstan are locked with the output signal of the ½ frequency divider circuit 412.

By selecting the frequency of the reference signal supplied from the terminal 401 and the frequency division ratio of the frequency divider circuit 410 to suitable values, the frequency of output signal of the ½ frequency divider circuit 412 can be set to a desired cylinder rotation frequency. By setting the tape running velocity to a desired value by means of the velocity servo circuit 430 and setting the frequency division ratio of the 1/N frequency divider circuit 451 in compliance with the frequency of output signal of the ½ frequency divider circuit 412, the tape can be run at a required velocity. Further, by making the frequency of output signal of the frequency divider circuit 410 substantially equal to the vertical synchronizing frequency of the video signal, the rotation number of the cylinder carrying the magnetic tape can be made to be equal to that for recording an analog signal. Since the cylinder is so designed that at the rotation number for recording of an analog signal, physical conditions between the cylinder and the magnetic tape are optimized, good contact can be obtained between the magnetic head and the magnetic tape and excellent recording characteristics can be ensured. By making the frequency division ratio smaller and making the output signal frequency of the frequency division circuit 410 higher, the rotation frequency of the cylinder can be increased easily to increase the relative velocity between the magnetic head and the magnetic tape and accordingly, even a signal at a high recording rate can be recorded.

During reproduction, by selecting the frequency of the reference signal inputted through the terminal 401 and the frequency division ratio of the frequency divider circuit 410 to suitable values, the signal frequency of the frequency divider circuit 410 can be made to be equal to that for recording. Through this, both of the cylinder system and the capstan system can be operated in the same way as that for reproducing an analog signal and the cylinder can be phase locked with the output signal of the ½ frequency divider circuit 412. Further, by switching the switching circuits 450 and 453, the control signal reproduced from the magnetic tape can be phase locked with the output signal of the ½ frequency divider circuit 412. In this manner, the same signal as that for recording can be reproduced from the VTR 53.

Table 1 shows examples of the rotation number of the cylinder. When recording an analog signal, the rotation number of the cylinder is about 1800 r.p.m. in the case of the input signal being an NTSC signal. When the input signal is of a PAL or SECAM, the field frequency of the signal is 50 Hz and therefore, the rotation number is about 1500 r.p.m. Obviously, the same values of the rotation number are available during reproduction. When recording a digital signal, the rotation number of the cylinder is about 1800 r.p.m. in the case where the number of scanning lines is 525 per frame and the field frequency is 59.94 Hz (indicated at column of NTSC in Table 1) and also in the case where the number of scanning lines is 625 per frame and the field frequency is 50 Hz (indicated at column of PAL/SECAM in Table 1).

TABLE 1

| | Rotation Number of Cylinder | |
|---|---|---|
| | NTSC | PAL/SECAM |
| Analog recording | 1800 rpm | 1500 rpm |
| Digital recording | 1800 rpm | 1800 rpm |

For both the system having the scanning line number being 525 and the system having the scanning line number being 625, the sampling frequency is usually selected to 13.5 MHz. Accordingly, on the assumption that the compression ratio is the same for both the systems, the transmission rate of data is the same for both the systems. Therefore, the rotation number is not required to be changed in accordance with the field frequency and when equality of the rotation number is desired to be maintained, the rotation number is set to around 1800 r.p.m. as shown in Table 1 corresponding to a higher field frequency which can permit recording of signals of higher rate. As has already been described, the rotation number of the cylinder can be determined by the frequency of the reference signal inputted through the terminal 401 and the frequency division ratio of the frequency divider circuit 410 in the embodiment shown in FIG. 6.

When the rate of a digital signal to be recorded is low, the rotation number of the cylinder can otherwise be selected to about 1500 r.p.m. In this case, the recording time can be prolonged.

As described above, recording and reproduction of an analog signal can be controlled in a similar manner to that for controlling in the conventional VTR. Further, it has been demonstrated that recording and reproduction of a digital signal can be effected in a similar manner to that for analog signal VTR by using the same tape transport system.

In the case of recording a digital signal, it has been found that when the same head as that for recording an analog signal is used and substantially the same cylinder rotation number and tape velocity as those for recording an analog signal are employed in order to suppress addition of head and changes in circuit, the following problem arises.

More particularly, when a digitally recorded tape is reproduced with the conventional analog VTR, a digital signal is FM demodulated and delivered in the form of a noise. Especially, when the output noise takes the form of an audio signal, this signal is delivered at a signal level up to the limit of a dynamic range, causing a loudspeaker to generate a large sound which surprises persons involved and possibly damages the apparatus.

A solution to this problem is to prevent a digital signal in excess of a predetermined level from being supplied continuously to an FM demodulator. This expedient is realized with the present invention as follows.

The azimuth angle of a head for recording a digital signal is made to be different from that of a head for recording an analog audio signal. Through this, when a tape recorded with a digital signal is reproduced with an analog VTR, a reproduced signal decreases in level and the analog head can act as a mute circuit for audio signal. To ensure a steady audio mute function, it is necessary that the azimuth angle of the head for digital signal differ from that of the analog head for recording audio signal by at least ±5°, preferably, ±10° or more. A formula for calculating the attenuation degree of reproduced signal due to the azimuth effect has been determined theoretically.

Figure 10:
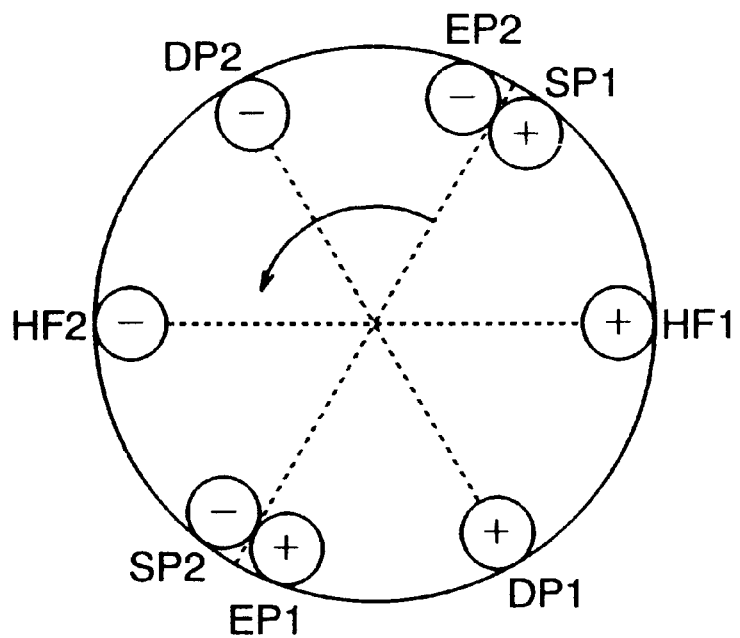
FIG. 10 is a diagram showing an embodiment of head arrangement in the VTR shown in FIG. 8.

Referring now to FIG. 10, an example of arrangement of heads on a cylinder when the VHS standard is presupposed. In FIG. 10, heads SP1 and SP2 are used for a so-called standard play mode during recording and reproduction of an analog video signal, heads EP1 and EP2 are used for a so-called super long play mode during recording and reproduction of an analog video signal, heads HF1 and HF2 are used for recording and reproduction of an FM audio signal, and heads DP1 and DP2 are used for recording and reproduction of a digital signal. In the Figure, a plus or minus sign indicates the direction of inclination of an azimuth angle of each head.

With the head arrangement shown in FIG. 10, when an analog signal is inputted, a video signal and an audio signal can be FM modulated and recorded in the standard play mode or super long play mode. Even when a digital signal is inputted, it can be recorded using the exclusive heads DP1 and DP2 each having an azimuth angle different from that of the head for analog signal recording. Thus, thanks to the fact that the azimuth angle differs for recording and reproduction even when a digitally recorded tape is reproduced by the analog VTR, a large reproduction level is not generated and the audio signal is muted to prevent an abnormal sound from being delivered and the apparatus from being damaged.

When the same magnetic tape is desired to be used for analog signal recording and digital signal recording, recording efficiency can be promoted by making the maximum frequency equal for the two kinds of signal recording.

In the case of a VTR of the VHS scheme, the FM carrier frequency of a brightness signal is 3.4 MHz for the synchronizing signal portion and 4.4 MHz for a 100% white signal. Practically, however, emphasis is applied to emphasize higher frequencies with a view of improving the S/N ratio, with the result that a signal in excess of 100% white signal level is inputted at an edge of a rectangular wave and a side-band wave of the higher frequency component is also transmitted to a certain extent. Therefore, a signal at 6 MHz can be considered to be transmitted steadily and when recording and reproducing a digital signal, recording and reproduction at a maximum of about 12 Mbps can be permitted.

Further, by using the exclusive heads for digital recording as in the case of the embodiment shown in FIG. 10 and designing the head gap for suitability to digital signal recording, recording efficiency can further be promoted. For example, by using a tape for high picture quality prescribed by the S-VHS format for digital signal recording, recording at higher density can be ensured. In the case of a VTR of the S-VHS scheme, the FM carrier frequency of the brightness signal is 5.4 MHz for the synchronizing signal portion and 7.0 MHz for a 100% white signal. Furthermore, since in the S-VHS the clip level of a signal is set to a high value, the maximum frequency allowed for practical recording and reproduction is 9 to 10 MHz. Accordingly, the maximum transmission rate allowed for recording and reproduction of a digital signal is about 18 to 20 Mbps. The tape used in the S-VHS scheme is made of a magnetic material having a larger coercive force than that of the tape used in the VHS scheme and hence recording at high density can be realized.

Table 2 shows examples of the azimuth angle, head width, gap length and track pitch of each head in that case. A head for digital signal recording has a larger azimuth angle than a head for analog video signal recording. In the analog video signal reproducing processing, a cross talk component affected by an adjacent track is suppressed by means of an interdigital filter at a color signal portion at which the azimuth effect is decreased. But for the digital signal which is not allowed to undergo the processing as above, an exclusive head is provided having a large azimuth angle, thereby ensuring that a low-frequency cross talk component from an adjacent track can be suppressed to decrease an interfering signal component from the adjacent track and the error rate can be decreased. By making the gap length of the head for digital signal recording smaller than that of other heads, recording efficiency of high frequency signal can further be promoted and recording at high density can be ensured. In addition, in the embodiment shown in Table 2, the track pitch for digital signal recording is made to be about half the track pitch for standard recording of analog signal. Through this, the S/N ratio well balances with the recording time, thus improving the recording density and prolonging the recording time.

TABLE 2

| Head | Azimuth angle | Head width | Gap length | Track pitch |
| --- | --- | --- | --- | --- |
| HF1,HF2 | ± 30° | 28 μm | 1.1 μm | 19/58 μm |
| SP1,SP2 | ± 6° | 48 μm | 0.35 μm | 58 μm |
| EP1,EP2 | ± 6° | 26 μm | 0.35 μm | 19 μm |
| DP1,DP2 | ± 15° | 40 μm | 0.23 μm | 29 μm |

Determination of the track pitch during digital signal recording has relation to the recording rate of a digital signal (namely, the maximum frequency to be recorded) and the track pitch is so determined that a required S/N ratio can be obtained at the maximum frequency. When a magnetic tape comparable to a tape pursuant to the S-VHS is used and the recording rate is set to about 18 to 20 Mbps, a practically acceptable error rate can be obtained by setting the track pitch to about 29 microns.

In Table 2, the track pitch of the heads HF1 and HF2 for recording an FM audio signal is described as 19/58 microns, indicating that the track pitch is 58 microns in the standard play mode and is 19 microns in the super long play mode.

Figure 11:
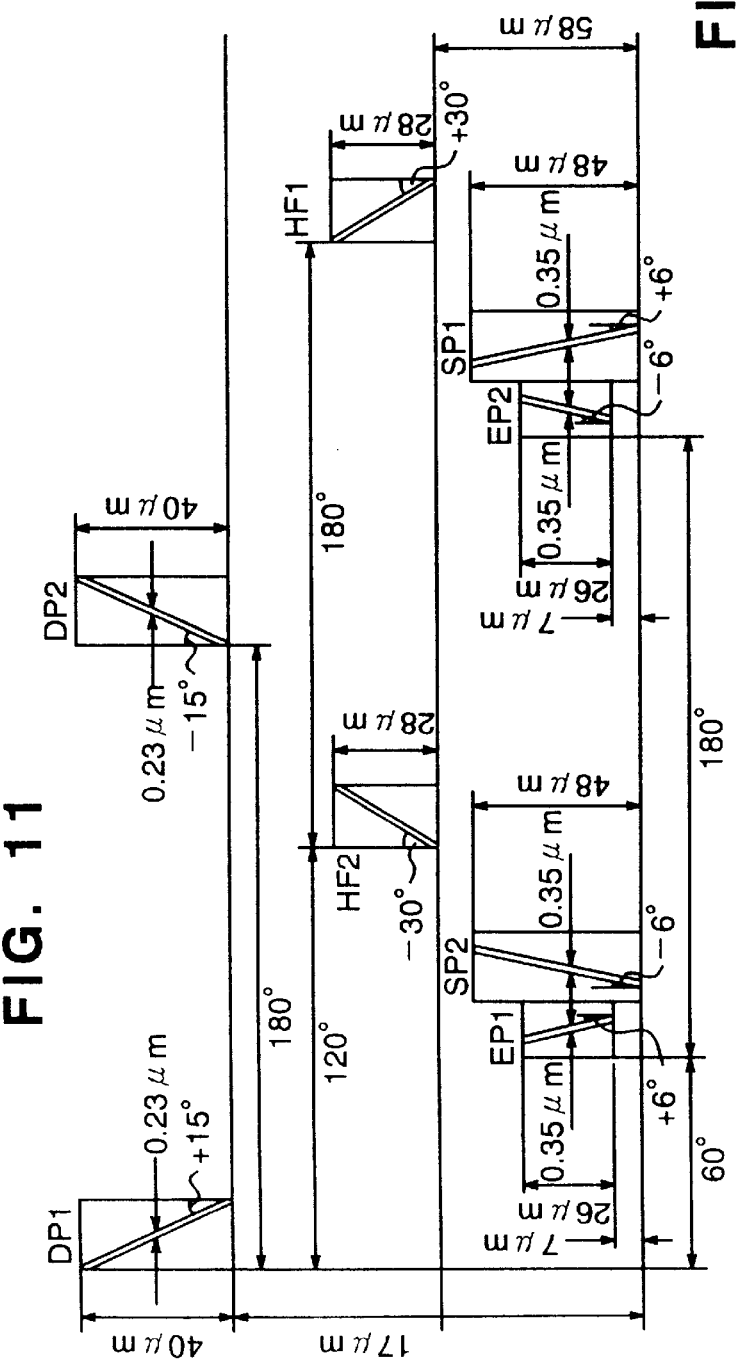
FIG. 11 is a view showing, in developed strip form, the head arrangement of FIG. 10 realized on the periphery of a cylinder.
Figure 12:
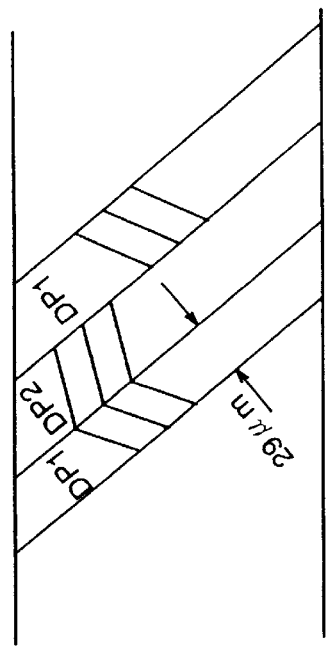
FIG. 12 is a diagram showing the relation between the track and the azimuth angle when data is recorded on a magnetic tape by using heads for digital signal of FIG. 10.

Referring to FIG. 11, the periphery of the cylinder is developed in strip form to schematically show the positional relation between the individual heads arranged on the cylinder as shown in FIG. 10 and each having geometrical dimensions as described in Table 2. Shown in FIG. 12 is the relation between the track and the azimuth angle when a digital signal is recorded on the magnetic tape. In FIG. 11, the heads for analog recording EP, SP and HF are dimensioned and arranged as shown but the heads for digital recording DP are illustrated as being displaced to an upper portion. Practically, however, the heads for digital recording DP are arranged with their lower ends displaced from the lower ends of the heads for analog recording SP by, for example, 17 microns.

The azimuth angle of the heads for digital recording is set to ±15°. According to the VHS standard, the exclusive head is used for FM audio signal recording and its azimuth angle is ±30°. Since the head for digital recording must have an azimuth angle which differs from that of the exclusive head for FM audio signal recording by at least ±5°, the azimuth angle of the head for digital recording must be more than 35° or less than 25°. With the azimuth angle increased, the effective relative velocity between the tape heads can be decreased to advantage. Contrarily, with the azimuth angle deceased, when reproducing a digital signal, a low frequency signal from an adjacent track is reproduced to decrease the S/N ratio of a reproduced signal and recording at high density is difficult to achieve. Here, the azimuth angle of the head for digital signal recording is selected to ±15° which is less than 25° and is expectant of the azimuth effect. Preferably, absolute value of the azimuth angle of the head for digital signal may be set to lie between about 10° and about 20°.

Figure 13:
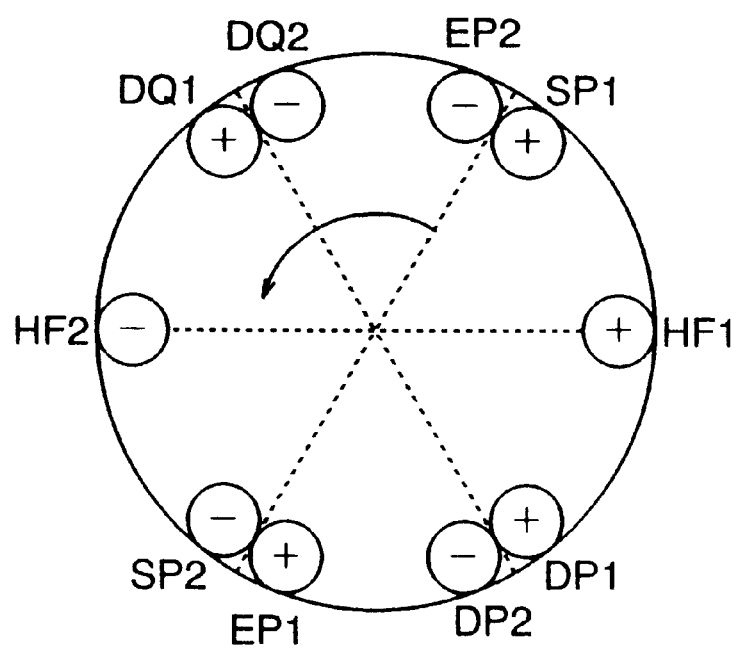
FIG. 13 is a diagram showing another embodiment of head arrangement in the VTR shown in FIG. 8.

Referring to FIG. 13, there is illustrated another embodiment of the head arrangement. In the embodiment shown in FIG. 13, two sets of heads for recording and reproducing a digital signal are provided for the purpose of increasing the amount of data, representative of a digital signal, which can be recorded per unit time. In FIG. 13, heads DQ1 and DQ2 are for recording and reproduction of a digital signal. In the embodiment constructed as shown in FIG. 13, signals are recorded simultaneously by means of a set of two heads DP1 and DP2 or the set of two heads DQ1 and DQ2. Therefore, as compared to the embodiment shown in FIG. 10, the amount of data which can be recorded per unit time can be doubled. Table 3 shows the azimuth angle, head width, gap length and track pitch of each head used in this embodiment.

TABLE 3

| Head | Azimuth angle | Head width | Gap length | Track pitch |
| --- | --- | --- | --- | --- |
| HF1,HF2 | ± 30° | 28 µm | 1.1 µm | 19/58 µm |
| SP1,SP2 | ± 6° | 48 µm | 0.35 µm | 58 µm |
| EP1,EP2 | ± 6° | 26 µm | 0.35 µm | 19 µm |
| DP1,DP2 | ± 15° | 40 µm | 0.23 µm | 29 µm |
| DQ1,DQ2 | ± 15° | 40 µm | 0.23 µm | 29 µm |

The periphery of the cylinder carrying the heads arranged as shown in FIG. 13 and each having geometrical dimensions as shown in Table 3 is developed in strip form as shown in FIG. 14. When a digital signal is recorded on a magnetic tape with the heads arranged as above, a track pattern as shown in FIG. 15 can be obtained.

In this case, too, the azimuth angle of each head for digital signal recording is selected to ±15° for the same reasons as above. Through this, effects similar to those of the examples shown in Table 2 can be attained.

Further, when tracking control is carried out in common to the case of analog recording and the case of digital recording by using a control signal as described in connection with the embodiment shown in FIG. 6, the control circuit can be used in common to thereby reduce the cost.

By making the azimuth angle of the head for digital signal larger than that of the head for analog video signal recording, the error rate of a digital signal can be decreased.

In addition, by making the gap length of the head for digital signal smaller than that of the head for analog signal, high frequency characteristics of digital signal recording and reproduction can be improved to thereby reduce the error rate of a digital signal.

By making the rotation number of the cylinder during digital signal recording substantially equal to that of the cylinder during analog NTSC recording, control operation can be simplified and the recording rate can be increased.

By making coercive force of the magnetic recording medium for digital signal recording larger than that of the magnetic recording medium for analog signal recording, the recording rate of a digital signal can be increased.

By making the azimuth angle of the head for digital signal different from that of the head for analog audio signal recording by at least ±5°, generation of abnormal sounds can be prevented even when a digitally recorded tape is inserted into the conventional analog VTR.

We claim:

1. An apparatus for selectively recording and/or reproducing an analog video signal and a digital signal including a bit compressed video signal, comprising:

analog signal heads, each being carried on a rotary cylinder, for recording and/or reproducing said analog video signal on/from a magnetic tape;

digital signal heads, each being carried on said rotary cylinder, for recording and/or reproducing said digital signal on/from said magnetic tape; and servo unit for controlling a rotational velocity of said rotary cylinder and transportational velocity of said magnetic tape, wherein said apparatus has both a plurality of analog recording modes for said analog video signal and a plurality of digital recording modes for said digital signal, and said servo unit controls said rotational velocity and said transportational velocity so that track pitches in said plurality of analog recording modes are different from each other, and track pitches in said plurality of digital recording modes are substantially same.

2. The apparatus according to claim 1, wherein said digital signal heads have an azimuth angle larger than that of said analog signal heads.

3. The apparatus according to claim 2, wherein said digital signal heads have a gap length smaller than that of said analog signal heads.

4. The apparatus according to claim 1, wherein said track pitch in a first analog recording mode is approximately 58 µm, said track pitch in a second analog recording mode is approximately 19 µm, and said track pitches in said plurality of digital recording modes are approximately 29 µm.

5. The apparatus according to claim 1, wherein servo unit controls a rotation number of said rotary cylinder to approximately 1800 r.p.m. both when recording and/or reproducing said analog video signal and when recording and/or reproducing said digital signal.

6. The apparatus according to claim 1, wherein servo unit controls a rotation number of said rotary cylinder to approximately 1800 r.p.m. when recording and/or reproducing said analog video signal pursuant to NTSC scheme, to approximately 1500 r.p.m. when recording and/or reproducing said analog video signal pursuant to PAL or SECAM scheme, and to approximately 1800 r.p.m. when recording and/or reproducing said digital signal.

7. The apparatus according to claim 1, wherein said magnetic tape has, during recording and/or reproducing of said digital signal, a coercive force which is equal to or larger than that of a magnetic tape used for recording and/or reproducing said analog video signal.

8. An apparatus for selectively recording and/or reproducing an analog video signal and a digital signal including a bit compressed video signal, comprising:

analog signal heads, each being carried on a rotary cylinder and having a predetermined azimuth angle, for recording and/or reproducing said analog video signal on/from a magnetic tape;

digital signal heads, each being carried on said rotary cylinder and having an azimuth angle larger than that of said analog signal heads, for recording and/or reproducing said digital signal on/from said magnetic tape; and servo unit for controlling a rotational velocity of said rotary cylinder and transportational velocity of said magnetic tape, wherein said apparatus has both a plurality of analog recording modes for said analog video signal and a plurality of digital recording modes for said digital signal, said servo unit controls a rotation number of said rotary cylinder to approximately 1800 r.p.m. both when recording and/or reproducing said analog video signal and when recording and/or reproducing said digital signal, and said servo unit further controls said transportational velocity so that a track pitch in one of said plurality of analog recording modes is approximately 58 $\mu$m, a track pitch in another one of said plurality of analog recording modes is approximately 19 $\mu$m, and track pitches in said plurality of digital recording modes are approximately 29 $\mu$m.

9. An apparatus for selectively recording and/or reproducing an analog video signal and a digital signal including a bit compressed video signal, comprising:

analog signal heads, each being carried on a rotary cylinder and having a predetermined azimuth angle, for recording and/or reproducing said analog video signal on/from a magnetic tape;

digital signal heads, each being carried on said rotary cylinder and having an azimuth angle larger than that of said analog signal heads, for recording and/or reproducing said digital signal on/from said magnetic tape; and servo unit for controlling a rotational velocity of said rotary cylinder and transportational velocity of said magnetic tape, wherein said apparatus has a plurality of analog recording modes for said analog video signal and a digital recording mode for said digital signal, and said servo unit controls said rotational velocity and said transportational velocity so that a track pitch in one of said plurality of analog recording modes is approximately 58 $\mu$m, a track pitch in another one of said plurality of analog recording modes is approximately 19 $\mu$m, and a track pitch in said digital recording mode is approximately 29 $\mu$m.

10. The apparatus according to claim 9, wherein said digital signal heads have a gap length smaller than that of said analog signal heads.

11. The apparatus according to claim 9, wherein servo unit controls a rotation number of said rotary cylinder to approximately 1800 r.p.m. both when recording and/or reproducing said analog video signal and when recording and/or reproducing said digital signal.

12. The apparatus according to claim 9, wherein servo unit controls a rotation number of said rotary cylinder to approximately 1800 r.p.m. when recording and/or reproducing said analog video signal pursuant to NTSC scheme, to approximately 1500 r.p.m. when recording and/or reproducing said analog video signal pursuant to PAL or SECAM scheme, and to approximately 1800 r.p.m. when recording and/or reproducing said digital signal.

13. The apparatus according to claim 9, wherein said magnetic tape has, during recording and/or reproducing of said digital signal, a coercive force which is equal to or larger than that of a magnetic tape used for recording and/or reproducing said analog video signal.

* * * * *